US012147843B2

(12) United States Patent
Tammana et al.

(10) Patent No.: US 12,147,843 B2
(45) Date of Patent: Nov. 19, 2024

(54) MIGRATION AND CUTOVER BASED ON EVENTS IN A REPLICATION STREAM

(71) Applicant: Oracle International Corporation, Redwood Shores, CA (US)

(72) Inventors: Venkata Rama Prasad Tammana, Redmond, WA (US); Gregg Alan Wilson, Austin, TX (US); Vanja Oljaca, Seattle, WA (US); Swarupa Ramakrishnan, Kirkland, WA (US); Girish Nagaraja, Sammamish, WA (US); Bhumikaben Rashmikant Patel, Redmond, WA (US); Nikhil Yograj Vaishnavi, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 9 days.

(21) Appl. No.: 17/935,718

(22) Filed: Sep. 27, 2022

(65) Prior Publication Data

US 2023/0094990 A1 Mar. 30, 2023

Related U.S. Application Data

(60) Provisional application No. 63/250,728, filed on Sep. 30, 2021.

(51) Int. Cl.
G06F 9/50 (2006.01)
G06F 9/48 (2006.01)
(Continued)

(52) U.S. Cl.
CPC .......... *G06F 9/5072* (2013.01); *G06F 9/4875* (2013.01); *G06F 9/50* (2013.01);
(Continued)

(58) Field of Classification Search
CPC ....... H04L 63/20; H04L 63/102; H04L 63/08; G06F 9/4875; G06F 9/4881; G06F 9/50; G06F 9/5022
See application file for complete search history.

(56) References Cited

U.S. PATENT DOCUMENTS 7,657,639 B2 2/2010 Hinton
9,781,122 B1 10/2017 Wilson et al.
(Continued)

FOREIGN PATENT DOCUMENTS

CA 3065615 A1 * 6/2020 ............. A47F 9/048
CN 108322471 4/2019
(Continued)

OTHER PUBLICATIONS

Case, Adam, "Migration" IBM Security Verify, https://docs.verify.ibm.com/verify/docs/migration; Oct. 27, 2021; 4 pages.
(Continued)

*Primary Examiner* — Khanh Q Dinh
(74) *Attorney, Agent, or Firm* — Kilpatrick Townsend & Stockton LLP

(57) ABSTRACT

A framework for migrating a customer tenancy from a first identity and access management (IAM) system to a second IAM system. A first snapshot of the customer tenancy is obtained from a first data storage. The first snapshot is processed and migrated to the second IAM system. A second snapshot of the customer tenancy is obtained from a second data storage and migrated to the second IAM system. A state of a lock associated with the second data storage is modified, where after a third snapshot of the customer tenancy is obtained from the second data storage and migrated to the second IAM system. Responsive to the third snapshot being migrated, directing a request regarding the customer tenancy to the second IAM system.

20 Claims, 12 Drawing Sheets

(51) Int. Cl.
  *G06F 21/60* (2013.01)
  *G06F 21/62* (2013.01)
  *H04L 9/40* (2022.01)

(52) U.S. Cl.
  CPC .......... *G06F 9/5083* (2013.01); *G06F 21/604* (2013.01); *G06F 21/6218* (2013.01); *H04L 63/20* (2013.01)

(56) References Cited

U.S. PATENT DOCUMENTS

| | | |
|---|---|---|
| 9,819,669 B1 | 11/2017 | Golwalkar |
| 9,838,376 B1 | 12/2017 | Lander et al. |
| 9,838,377 B1 | 12/2017 | Lander et al. |
| 9,870,238 B2* | 1/2018 | Astete .............. H04L 63/10 |
| 10,200,358 B2 | 2/2019 | Lander et al. |
| 10,218,705 B2 | 2/2019 | Wilson et al. |
| 10,255,061 B2 | 4/2019 | Lander et al. |
| 10,261,836 B2 | 4/2019 | Bansal et al. |
| 10,263,947 B2 | 4/2019 | Vats et al. |
| 10,341,410 B2 | 7/2019 | Lander et al. |
| 10,348,858 B2 | 7/2019 | Theebaprakasam et al. |
| 10,425,386 B2 | 9/2019 | Wardell et al. |
| 10,445,395 B2 | 10/2019 | Carru et al. |
| 10,454,915 B2 | 10/2019 | Mohamad Abdul et al. |
| 10,454,940 B2 | 10/2019 | Lander et al. |
| 10,484,243 B2 | 11/2019 | Cole et al. |
| 10,484,382 B2 | 11/2019 | Wilson et al. |
| 10,505,941 B2 | 12/2019 | Vats et al. |
| 10,511,589 B2 | 12/2019 | Gangawane et al. |
| 10,516,672 B2 | 12/2019 | Gupta et al. |
| 10,530,578 B2 | 1/2020 | Keshava et al. |
| 10,567,364 B2 | 2/2020 | Vats et al. |
| 10,579,367 B2 | 3/2020 | Lander et al. |
| 10,581,820 B2 | 3/2020 | Keshava et al. |
| 10,585,682 B2 | 3/2020 | Jain et al. |
| 10,594,684 B2 | 3/2020 | Bansal et al. |
| 10,616,224 B2 | 4/2020 | Subramanian et al. |
| 10,693,861 B2 | 6/2020 | Lander et al. |
| 10,715,564 B2 | 7/2020 | Mohamad Abdul et al. |
| 10,721,237 B2 | 7/2020 | Vats et al. |
| 10,735,394 B2 | 8/2020 | Gupta et al. |
| 10,764,273 B2 | 9/2020 | Mohamad Abdul et al. |
| 10,791,087 B2 | 9/2020 | Medam et al. |
| 10,798,165 B2 | 10/2020 | Srinivasan et al. |
| 10,831,789 B2 | 11/2020 | Srinivasan et al. |
| 10,834,137 B2 | 11/2020 | Pitre et al. |
| 10,846,390 B2 | 11/2020 | Subramanian et al. |
| 10,848,543 B2 | 11/2020 | Lander et al. |
| 10,878,079 B2 | 12/2020 | Vepa et al. |
| 10,904,074 B2 | 1/2021 | Wilson et al. |
| 10,931,656 B2 | 2/2021 | Carru et al. |
| 11,023,555 B2 | 6/2021 | Carru et al. |
| 11,061,929 B2 | 7/2021 | Xu et al. |
| 11,088,993 B2 | 8/2021 | Wardell et al. |
| 11,165,634 B2 | 11/2021 | Medam et al. |
| 11,308,132 B2 | 4/2022 | Srinivasan et al. |
| 11,321,343 B2 | 5/2022 | Srinivasan et al. |
| 11,489,863 B1* | 11/2022 | Shua .................. G06F 9/45558 |
| 2008/0021866 A1 | 1/2008 | Hinton et al. |
| 2008/0104250 A1 | 5/2008 | Vanyukhin et al. |
| 2009/0235115 A1* | 9/2009 | Butlin .............. G06F 11/1662 711/170 |
| 2014/0198115 A1* | 7/2014 | Sakamoto ............... G06T 11/00 345/522 |
| 2016/0359878 A1* | 12/2016 | Prasad ............. G06F 16/24578 |
| 2017/0099281 A1 | 4/2017 | Trevathan et al. |
| 2017/0132222 A1* | 5/2017 | Li ........................ G06F 16/94 |
| 2018/0083915 A1* | 3/2018 | Medam .............. G06F 16/2246 |
| 2020/0264860 A1 | 8/2020 | Srinivasan et al. |
| 2020/0358672 A1* | 11/2020 | Lange ............... H04L 41/5096 |
| 2021/0055927 A1* | 2/2021 | Sarukkai .................. G06F 8/71 |
| 2021/0081252 A1 | 3/2021 | Bhargava et al. |
| 2021/0084031 A1 | 3/2021 | Lao et al. |
| 2022/0200804 A1* | 6/2022 | Long ..................... H04L 9/321 |
| 2022/0345481 A1* | 10/2022 | Shua ..................... H04L 67/101 |
| 2022/0345483 A1* | 10/2022 | Shua ..................... H04L 9/0825 |
| 2023/0094990 A1* | 3/2023 | Tammana ............... G06F 9/541 709/224 |

FOREIGN PATENT DOCUMENTS

| | | |
|---|---|---|
| CN | 108337260 | 4/2019 |
| CN | 108322472 | 6/2019 |
| CN | 107852417 | 4/2021 |
| CN | 109639687 | 5/2021 |
| CN | 109565505 | 6/2021 |
| CN | 109314704 | 7/2021 |
| DE | 102017003243 | 10/2018 |
| EP | 3311548 | 4/2019 |
| EP | 3361702 | 10/2019 |
| EP | 3528454 | 8/2020 |
| EP | 3494683 | 11/2020 |
| EP | 3577885 | 5/2021 |
| EP | 3361700 | 8/2021 |
| EP | 3361701 | 9/2021 |
| JP | 6491381 | 3/2019 |
| JP | 6491774 | 3/2019 |
| JP | 6491796 | 3/2019 |
| JP | 6917331 | 7/2021 |
| KR | 101871902 | 6/2018 |
| KR | 101873941 | 7/2018 |
| KR | 101874384 | 7/2018 |
| KR | 102041941 | 11/2019 |

OTHER PUBLICATIONS

Migrate identity providers to Azure AD B2C, Microsoft Docs https://docs.microsoft.com/en-us/powerapps/maker/portals/configure/migrate-identity-providers; Jul. 15, 2021, 7 pages.

Li, Kevin, "Setup Multiple Identity Providers for SAP Analytics Cloud" https://blogs.sap.com/2021/06/14/setup-multiple-identity-providers-for-sap-analytics-cloud/; Jun. 14, 2021, 13 pages.

Best practices for federating Google Cloud with an external identity provider https://cloud.google.com/architecture/identity/best-practices-for-federating; 15 pages.

Kaufman, Michelle, et al. "IBM Cloud Self-Service Federation for External Identity Providers" https://www.ibm.com/cloud/blog/announcements/ibm-cloud-self-service-federation-for-external-identity-providers; 4 pages.

Nixu, "How to cope with digital identities—Migrating from RBAC to ABAC" https://www.nixu.com/blog/how-cope-digital-identities-migrating-rbac-abac-part-4; Nov. 30, 2016, 4 pages.

Chapter 8. Updating and Migrating Identity Management, Red Hat Enterprise Linux: Linux Domain Identity, Authentication, and Policy Guide, Available Online at: https://access.redhat.com/documentation/en-us/red_hat_enterprise_linux/7/html/linux_domain_identity_authentication_and_policy_guide/updating-migrating, 2021, pp. 98-106.

EIDM to IDM Migration Overview, Available Online at: https://www.cms.gov/Research-Statistics-Data-and-Systems/CMS-Information-Technology/EnterpriseIdentityManagement/EIDM-Training-Videos, Dec. 1, 2021, 3 pages.

Migrate Users to Azure AD B2C, Available Online at: https://docs.microsoft.com/en-us/azure/active-directory-b2c/user-migration, Oct. 25, 2021, 6 pages.

Migrating from Legacy IAM to Modern Access Management, Available Online at: https://www.exclusive-networks.com/nl/wp-content/uploads/sites/21/2020/12/WP_Migrating_from_IAM_WP_A4_v4.pdf, Sep. 2020, 12 pages.

Jones, Advance Your Modernize IAM Program with ForgeRock's New Accelerators, Available Online at: https://www.forgerock.com/blog/advance-your-modernize-iam-program-forgerocks-new-accelerators, Mar. 11, 2020, 3 pages.

Lindgren, How to Migrate Your Identity and Access Management (IAM) System (1/2): Methods and Considerations, Available Online at: https://www.ubisecure.com/identity-platform/how-to-migrate-iam-system/, Feb. 7, 2020, 13 pages.

Maida, How to Migrate Your Gigya Users to Auth0, Available Online at: https://auth0.com/blog/migrate-your-gigya-users-to-auth0/, Oct. 3, 2017, 11 pages.

(56) References Cited

OTHER PUBLICATIONS

Wallen, How to Migrate Users From One Identity System to Another, Available Online at: https://auth0.com/blog/how-to-migrate-users-from-one-identity-system-to-another/, Mar. 24, 2020, 8 pages.

* cited by examiner

| Migration Phase | Source | Kiev Lock Status | Migration Status | Authoritative Source |
|---|---|---|---|---|
| Phase I | Object Storage | Unlocked | Pending | IAM |
| Phase II (Iteration 1) | Tenant Buffer | Unlocked | Pending | IAM |
| Phase II (Iteration 2) | Tenant Buffer | Locked | Complete | IDCS |

FIG. 3C

MIGRATION AND CUTOVER BASED ON EVENTS IN A REPLICATION STREAM

CROSS-REFERENCES TO RELATED APPLICATIONS

This application is a non-provisional of and claims the benefit of the filing date of U.S. Provisional Application No. 63/250,728, filed on Sep. 30, 2021, the contents of which are incorporated herein by reference in its entirety for all purposes.

FIELD

The present disclosure relates to a framework for migrating customer tenancies (i.e., users and data) from one identity and access management system to another identity and access management system.

BACKGROUND

Cloud service providers (CSP) offer services under different models including Software-as-a-Service (SaaS), Platform-as-a-Service (PaaS), and Infrastructure-as-a-Service (IaaS) models. In the cloud environment, an identity and access management (IAM) system is generally provided by the CSP to control user access to resources provided or used by a cloud service. Typical services or functions provided by an IAM system include, without restriction, single-sign on capabilities for users, authentication and authorization services, and other identity-based services.

The resources that are protected by the IAM system can be of different types, such as compute instances, block storage volumes, virtual cloud networks (VCNs), subnets, route tables, various callable APIs, and/or internal or legacy applications. These resources include resources stored in the cloud and/or customer on-premise resources. Each resource is identified by a unique identifier that is assigned to the resource when the resource is created. In typical CSP operations, a first IAM system is provided to control user access to a first type of service e.g., IaaS. Separately, a second IAM system is provided for security and identity management for a second type of application e.g., SaaS or PaaS services. As a result, if a customer subscribes to both the first and second types of services, the customer is required to have two separate accounts (i.e., a separate account associated with each IAM system). This results in an unsatisfactory customer experience. Embodiments described herein address these and other problems, individually and collectively.

BRIEF SUMMARY

A cloud service provider (CSP) provides multiple cloud services to subscribing customers. Typically, separate and independent identity and access management (IAM) systems are provided by the CSP to control user access to the different services. As such, if a customer subscribes to different services provided by the CSP, the customer is required to have separate accounts (with respect to the different IAM systems), which leads to an unsatisfactory customer experience. The present disclosure provides a framework for migrating customer tenancies (i.e., customer accounts) from a first IAM system to a second IAM system in real time while incurring minimal downtime for the customer. A snapshot of a customer tenancy can include information pertaining to one or more user accounts, credentials of users associated with the one or more accounts and/or resources associated with the one or more accounts. It is appreciated that the first IAM system is independent and different from the second IAM system. In one aspect of the present disclosure, customer tenancies are migrated in real time i.e., customer tenancies are migrated from the first IAM system to the second IAM system, while the first IAM system continues to receive requests directed to the customer tenancy. A locking mechanism is provided to seamlessly determine an authoritative source for a customer tenancy, and new customer requests are directed accordingly to a control plane of the authoritative IAM system. Additionally, the present disclosure provides a framework for reverting migrated customer tenancies i.e., migrating the customer tenancies from the second IAM system back to the first IAM system in order to tackle customer issues with migrated accounts.

One aspect of the present disclosure provides a method comprising: receiving, by a first identity and access management (IAM) system of a cloud service provider (CSP), a request to migrate a customer tenancy from the first IAM system to a second IAM system of the CSP; obtaining, by the first IAM system, a first snapshot of the customer tenancy stored in a first data storage, wherein the customer tenancy includes information related to at least one or more user accounts, or credentials and resources associated with the one or more user accounts; migrating the first snapshot of the customer tenancy to the second IAM system; obtaining, by the first IAM system, a second snapshot of the customer tenancy from a second data storage; migrating the second snapshot of the customer tenancy to the second IAM system; modifying a state of a lock associated with the second data storage; obtaining a third snapshot of the customer tenancy from the second data storage; migrating the third snapshot of the customer tenancy to the second IAM system; and responsive to migrating the third snapshot, directing a request regarding the customer tenancy to the second IAM system.

Another aspect of the present disclosure provides a non-transitory computer-readable medium storing specific computer-executable instructions that, when executed by a processor, cause a computer system to execute a method, the method comprising: receiving, by a first identity and access management (IAM) system of a cloud service provider (CSP), a request to migrate a customer tenancy from the first IAM system to a second IAM system of the CSP; obtaining, by the first IAM system, a first snapshot of the customer tenancy stored in a first data storage, wherein the customer tenancy includes information related to at least one or more user accounts, or credentials and resources associated with the one or more user accounts; migrating the first snapshot of the customer tenancy to the second IAM system; obtaining, by the first IAM system, a second snapshot of the customer tenancy from a second data storage; migrating the second snapshot of the customer tenancy to the second IAM system; modifying a state of a lock associated with the second data storage; obtaining a third snapshot of the customer tenancy from the second data storage; migrating the third snapshot of the customer tenancy to the second IAM system; and responsive to migrating the third snapshot, directing a request regarding the customer tenancy to the second IAM system.

By one aspect of the present disclosure, there is provided a computing device comprising a processor; and a memory including instructions that, when executed with the processor, cause the computing device to, at least: receive a request to migrate a customer tenancy from a first IAM system of a cloud service provider (CSP) to a second IAM system of the CSP; obtain a first snapshot of the customer tenancy stored in a first data storage, wherein the customer tenancy includes information related to at least one or more user accounts, or credentials and resources associated with the one or more user accounts; migrate the first snapshot of the customer tenancy to the second IAM system; obtain a second snapshot of the customer tenancy from a second data storage; migrate the second snapshot of the customer tenancy to the second IAM system; modify a state of a lock associated with the second data storage; obtain a third snapshot of the customer tenancy from the second data storage; migrate the third snapshot of the customer tenancy to the second IAM system; and responsive to the third snapshot being migrated, directing a request regarding the customer tenancy to the second IAM system.

The foregoing, together with other features and embodiments will become more apparent upon referring to the following specification, claims, and accompanying drawings.

BRIEF DESCRIPTION OF THE DRAWINGS

FIG. 3C depicts a table illustrating migration phases, lock status, and an authoritative source of a customer tenancy in accordance with various embodiments.

DETAILED DESCRIPTION

Figure 1:
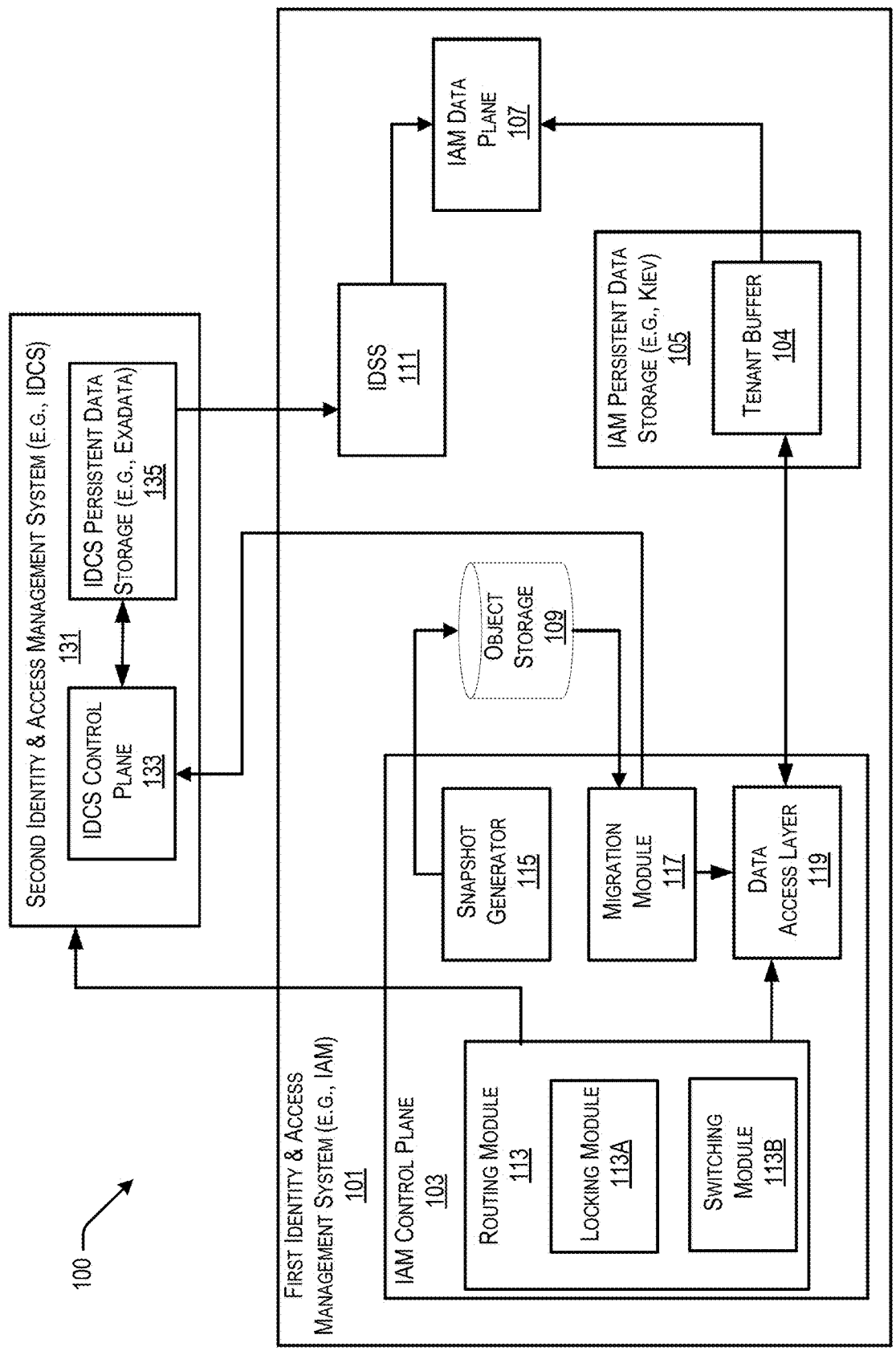
FIG. 1 depicts an exemplary architecture of a system illustrating migration of a customer tenancy from a first identity and access management (IAM) system to a second IAM system in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Introduction

A cloud service provider (CSP) may provide multiple cloud services to subscribing customers. These services may be provided under different models including Software-as-a-Service (SaaS), Platform-as-a-Service (PaaS), an Infrastructure-as-a-Service (IaaS) model, and others. In the cloud environment, an identity management system is generally provided by the CSP to control user access to resources provided or used by a cloud service. Typical services or functions provided by an identity management system include, without restriction, single-sign on capabilities for users, authentication and authorization services, and other identity-based services. The resources that are protected by an identity management system can be of different types, such as compute instances, block storage volumes, virtual cloud networks (VCNs), subnets, route tables, various callable APIs, internal or legacy applications, and the like. These resources include resources stored in the cloud and/or customer on-premise resources. Each resource is typically identified by a unique identifier (e.g., an ID) that is assigned to the resource when the resource is created.

A CSP may provide two or more two separate and independent identity management systems for their cloud offerings. This may be done, for example, where a first identity management system or platform (e.g., Infrastructure Identity and Access Management (IAM)) may be provided for controlling access to cloud resources for IaaS applications and services provided by the CSP. Separately, a second identity management system or platform (e.g., Identity Cloud Services (IDCS)) may be provided for security and identity management for SaaS and PaaS services provided by the CSP.

As a result of providing such two separate platforms, if a customer of the CSP subscribes to both a SaaS or PaaS service and an IaaS service provided by the CSP, the customer generally has two separate accounts—one account with IAM for the IaaS subscription and a separate account with IDCS for the PaaS/SaaS subscription. Each account will have its own credentials, such as user login or password. The same customer then has two separate sets of credentials for the two accounts. This results in an unsatisfactory customer experience. Additionally, having two separate identity management systems also creates obstacles for interactions between SaaS/PaaS and IaaS services.

For purposes of this application, and as an example, the first IAM system is assumed to be a Cloud Infrastructure Identity and Access Management system (referred to herein as IAM system) that provides for controlling access to cloud resources, such as IaaS applications, whereas the second IAM system is assumed to be an Identity Cloud Services system (referred to herein as IDCS) that provides for security and identity management for services, such as SaaS and PaaS. These names and terms are however not intended to be limiting in any manner. The teachings of this disclosure apply to any situation where two (or more) different identity management systems are to be integrated. The identity management systems or platforms to be integrated may be provided by one or more CSPs.

In certain embodiments, an integrated identity management platform (referred to as Integrated Identity Management System (IIMS)) is provided that integrates the multiple identity management platforms (e.g., IAM and IDCS platforms) in a manner that is transparent to the users or customers of the cloud services while retaining and offering the various features and functionalities offered by the two separate (e.g., IAM and IDCS) platforms. The integration thus provides a more seamless and enhanced user experience.

This integration, however, is technically very difficult for several reasons. The two platforms may use different procedures and protocols for implementing the identity-related functions. IAM may, for example, be an attribute-based access control (ABAC) system, also known as policy-based access control system, which defines an access control paradigm, whereby access rights are granted to users through the use of policies that express a complex Boolean rule set that can evaluate many different attributes. The purpose of ABAC is to protect objects, such as data, network devices, and IT resources from unauthorized users and actions—those that do not have "approved" characteristics as defined by an organization's security policies. On the other hand, IDCS may be a role-based access control (RBAC) system, which is a policy-neutral access-control mechanism defined around roles and privileges. The components of RBAC, such as role-permissions, user-role and role-role relationships make it simple to perform user assignments. As yet another reason, the authentication and authorization frameworks or workflows (e.g., types of tokens that are used, different authentication frameworks, such as OAUTH) used by the two platforms may be different. This is just a small sampling of reasons why providing an integrated solution is technically difficult.

In the IAM system, when a customer signs up for an account to avail services provided the IAM system, a customer tenancy is created. A tenancy is defined herein as a secure and isolated partition within the cloud infrastructure where the customer can create, organize, and administer cloud resources. Further, in the IAM system, a domain is defined as a container for managing an isolated set of identity principals within a tenancy. For instance, a domain contains users that represent human users accessing the system and groups that are a static collection of such users. In contrast, in the IDCS system, a unit of isolation for users and groups is referred to as a stripe. Specifically, a stripe is a container, where users or group of users can access their cloud resources. It is to be appreciated that a domain is persisted in a control plane of the IAM system (e.g., a persistent data storage, such as a key-value database), whereas a stripe is persisted in the control plane of the IDCS system (e.g., a persistent data storage, such as Exadata database). Further, there is a one-to-many relationship between a customer tenancy and domains in the IAM system, whereas there is a one-to-one relationship between domains and stripes.

FIG. 1 depicts an exemplary architecture of a system illustrating migration of a customer tenancy from a first identity and access management (IAM) system to a second IAM system in accordance with various embodiments. As shown in FIG. 1, the first IAM system 101 includes an IAM control plane 103, an object storage 109, a persistent data storage 105 e.g., Kiev data storage, a tenant buffer 104 included in the persistent data storage 105, a data plane 107, and an identity shard service (IDSS) 111. The IAM control plane 103 of the first IAM system 101 includes a routing module 113 (which hosts a locking module 113A and a switching module 113B), a snapshot generator 115, a migration module 117, and a data access layer 119. By some embodiments, the second identity and access management system 131 corresponds to an IDCS system. The IDCS system 131 includes an IDCS control plane 133 and an IDCS persistent data storage 135 e.g., an Exadata database.

In what follows, there is a described a migration process that migrates a customer tenancy from the first IAM system 101 to the second IAM system i.e., the IDCS system 131. According to some embodiments, the IAM data plane 107 includes an in-memory database e.g., a BDB database that is used by the IAM data plane 107 while performing authorization services. Specifically, the IAM data plane 107 queries the in-memory database as opposed to querying the persistent storage 105 for performance and availability reasons. According to some aspects of the present disclosure, there is provided the identity shard service (IDSS) 111 in the first IAM system. As the scale of data that is migrated from one IAM system to another IAM system is large, it is possible that the data may not fit in a single hosting data plane. By some embodiments, data from the persistent data storage of the IDCS system 135 may be replicated in the IDSS 111 for quick and seamless access.

According to some embodiments, the process of migrating a customer tenancy occurs in two phases, referred to herein as phase I and phase II. As described below, in each of the two phases of migration, the migration module 117 included in the control plane of the first IAM system 101 obtains information related to the customer tenancy that is being migrated from different data storages. Furthermore, as described below, the locking module 113A included in the routing module 113 instantiates a locking mechanism (in each phase of migration) on the persistent data storage of the IAM system 105, in order to ensure that the customer tenancy is migrated in real time in a seamless manner.

In operation, upon the IAM control plane 103 receiving a request to migrate a customer tenancy to the second IAM system 131, the migration module 117 selects (and validates) the customer tenancy that is to be migrated from the IAM system to the IDCS system. In the first phase of migration i.e. phase I, the migration module 117 obtains a snapshot (e.g., first snapshot) of the selected customer tenancy from the object storage 109. It is noted that the snapshot generator 115 may be programmed to capture a snapshot of customer tenancies e.g., from the persistent data storage 105, and store the captured snapshots in the object storage 109 for retrieval by the migration module 117. As defined herein, a snapshot of a tenancy corresponds to a compressed view of all events occurring within the tenancy since creation. It is appreciated that an event corresponds to a customer action (e.g., CRUD operations) performed on resources in the tenancy. It is noted that each event occurring in the customer tenancy is represented by a unique identifier e.g., a sequence number. Accordingly, in some embodiments, a snapshot of the customer tenancy can include information pertaining to one or more user accounts, credentials of users associated with the one or more accounts and/or resources associated with the one or more accounts.

Upon obtaining the snapshot of the customer tenancy (i.e., the first snapshot), the migration module 117 processes the obtained snapshot. For instance, the migration module 117 performs a conversion operation with respect to the obtained snapshot. Specifically, the migration module 117 converts a format of each event in the snapshot to a format that is acceptable by the IDCS system 131. Upon completion of the conversion operation, the migration module 117 transmits a request to the control plane of the IDCS system 133, to create a stripe in the IDCS system for the customer tenancy. The migration module 117 obtains a URL of the stripe where information included in the customer tenancy is going to be migrated to. It is appreciated that the mechanism of creating the stripe as described above is in no way limiting the scope of the present disclosure. Rather, the creation of a stripe in the IDCS system can occur before obtaining a snapshot of a customer tenancy. The migration module 117 upon obtaining the first snapshot of the customer tenancy from the object storage transfers i.e. migrates the first snapshot over to the IDCS system 131 for being stored in the created stripe.

In this manner, the events corresponding to the first snapshot of the customer tenancy are migrated to the stripe in the IDCS system. In phase I of the migration process, a status of a migration workflow is set to as "migration pending" or "migration in progress". Additionally, the IAM system 101 is designated as an authoritative source with respect to the customer tenancy being migrated i.e., any new customer requests associated with the customer tenancy continue to be directed to the control plane of the IAM system e.g., via the switching module 113B. Further, the locking module 113A controls a lock (e.g., a write lock) associated with the persistent storage of the IAM system (i.e., the Kiev data) 105. Specifically, in phase I, the locking module 113A sets the lock to an unlocked state, thereby implying that new requests directed to the customer tenancy that is being migrated are directed to the control plane of the IAM system 101. In other words, while the migration module 117 is migrating the customer tenancy (i.e., based on the first snapshot obtained from the object storage), the IAM system 101 continues to accept new requests directed to the customer tenancy. Such new requests are logged into the tenant buffer 104 that is included in the persistent data storage 105. In this manner, the migration module 117 commences the migration of the customer tenancy from the IAM system to the IDCS system, while continuing to actively process new requests directed to the customer tenancy.

Upon migrating the tenancy snapshot (e.g., the first snapshot) obtained from the object storage 109 in phase I, the migration module 117 commences the second phase of migration i.e., phase II. By some embodiments, the second phase of migration includes two iterations i.e., iteration 1 and iteration 2. In the first iteration of phase II, the migration module 117 obtains, via the data access layer 119, a snapshot of the customer tenancy stored in the tenant buffer 104 included in the persistent storage 105 of the IAM system 101. Upon obtaining the snapshot e.g. second snaphot, the migration module 117 performs a conversion operation (as described previously) on the list of events included in the snapshot, and transmits a subsequent request to the IDCS control plane 133 to store the events in the stripe. It is noted that the migration module 117 can utilize the sequence numbers associated with the events, to ensure that the first event included in the second snapshot obtained from the tenant buffer 104 corresponds to one, which succeeds the sequence number of the last event included in the first snapshot obtained from the object storage 109. Further, while transferring the second snapshot to the IDCS system 131, the locking module 113A maintains the lock associated with the persistent data storage 105 in the unlocked state. In other words, any further new requests (directed to the customer tenancy) continue to be logged in the tenant buffer 104. Thus, in the first iteration of the second phase of migration, the IAM system 101 continues to be the authoritative source with respect to the customer tenancy.

Once the migration module 117 completes the transfer of the events included in the tenant buffer i.e., completes migration of the second snapshot, the migration module 117 proceeds to execute the second iteration of the phase II of migration. In the second iteration, the locking module 113B updates the state of the lock to a locked state. In doing so, no further customer requests are logged in the tenant buffer 104. In the second iteration, the migration module 117 processes the tenant buffer to migrate any events that may have stored in the buffer, while the first iteration of phase II was being performed and prior to the lock being set to the locked state. That is the migration module obtains a further snapshot of the customer tenancy e.g., third snapshot from the tenant buffer 104 and processes the events included in the third snapshot to be migrated over to the IDCS system 131. Upon completion of the second iteration of phase II, the migration module 117 updates the status of the migration workflow as "migration completed". Further, the migration module updates the authoritative source with respect to the customer tenancy to be the IDCS system. As such, the switching module 113B routes new customer requests (associated with the customer tenancy) to the control plane of the IDCS system 133.

It is appreciated that the above described embodiment with respect to migrating a customer tenancy is in no way limiting the scope of the present disclosure. For instance, rather than migrating a single customer tenancy at a given time, the migration module 117 may obtain snapshots of multiple customer tenancies and perform a bulk post operation i.e., concurrent migration of multiple customer tenancies. Furthermore, it is noted that while migrating a particular customer tenancy, the migration module 117 obtains snapshots of the customer tenancy i.e., a copy of information related to the customer tenancy. In other words, information related to the customer tenancy is also stored in the IAM system 101. This provides the migration module the advantageous ability to perform a reverse migration operation i.e., revert the customer tenancy controls back to IAM. Details pertaining to reverse migration are described later with reference to FIG. 4B.

Additionally, by some embodiments, the customer tenancies in the IAM system 101 share a federated relationship with corresponding stipes residing in the IDCS system 131. As such, a customer can sign in to a console of the IAM system using user credentials configured in IDCS. The stripe is a federated identity provider in IAM. The users and groups in the stripe are provisioned in IAM through a system for cross-domain identity management (SCIM) service i.e., a system for automating exchange of user credentials between the two systems, at which point they can attach credentials as if they were native IAM users. The above described mechanisms of migrating customer tenancies from IAM to IDCS can be easily applied to the case of federated migrations i.e., migrating information from the IAM system to an already existing stripe in the IDCS system.

Figure 2:
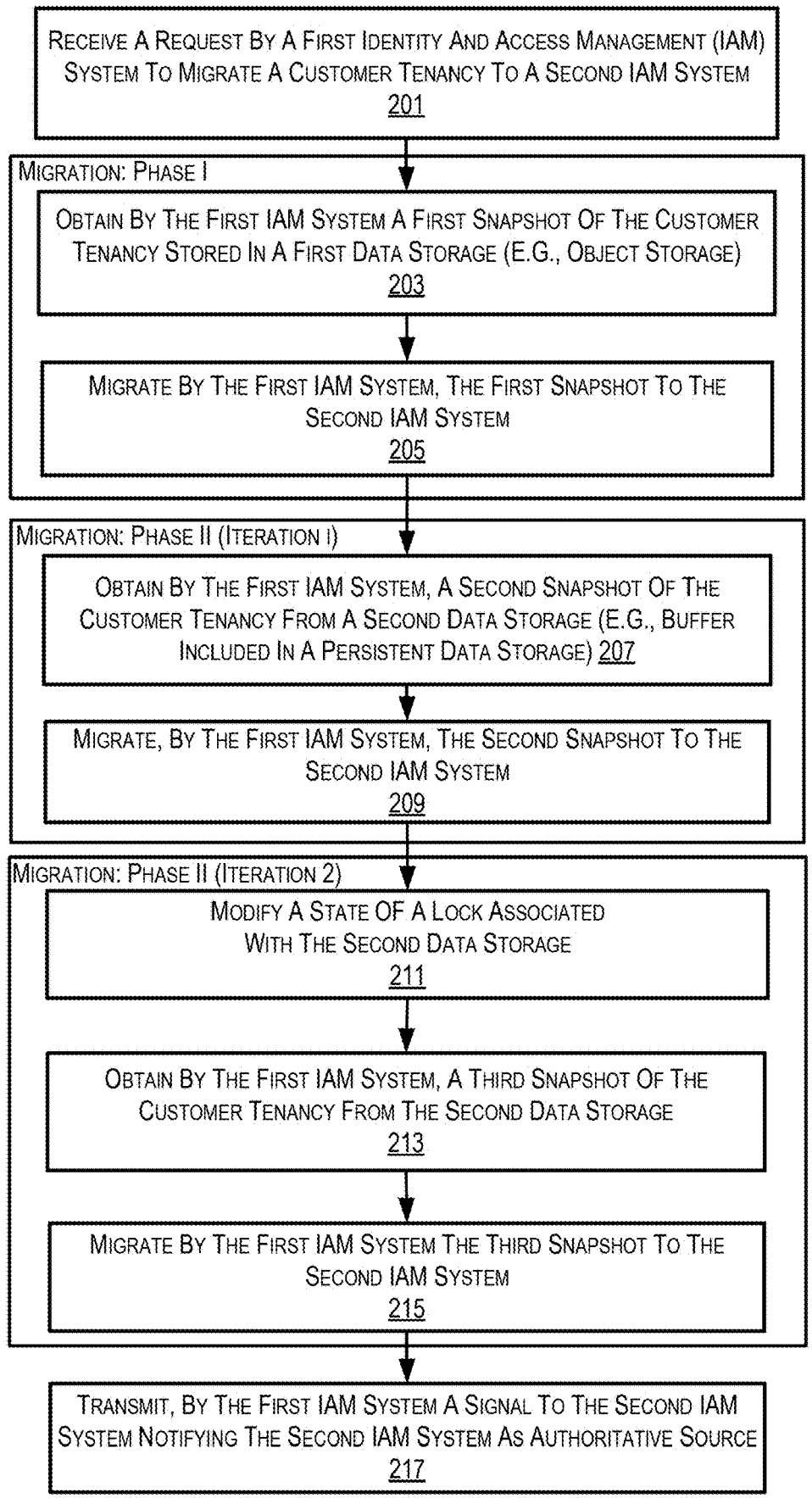
FIG. 2 depicts a flowchart illustrating steps performed in migrating a customer tenancy from the first IAM system to the second IAM system in accordance with various embodiments.

FIG. 2 depicts a flowchart illustrating steps performed in migrating a customer tenancy from a first IAM system to a second IAM system in accordance with various embodiments. The processing depicted in FIG. 2 may be implemented in software (e.g., code, instructions, program) executed by one or more processing units (e.g., processors, cores) of the respective systems, using hardware or combinations thereof. The software may be stored on a non-transitory storage medium (e.g., on a memory device). The method presented in FIG. 2 and described below is intended to be illustrative and non-limiting. Although FIG. 2 depicts the various processing steps occurring in a particular sequence or order, this is not intended to be limiting. In certain alternative embodiments, the processing may be performed in some different order or some steps may also be performed in parallel. For sake of illustration, the steps of the flowchart of FIG. 2 are described with reference to a customer tenancy being migrated from the first IAM system (e.g., IAM system 101 of FIG. 1) to the second IAM system (e.g., IDCS system 131 of FIG. 1).

The process commences in step 201, where the first IAM system receives a request to migrate a customer tenancy to the second IAM system. It is noted that a control plane of the first IAM system (e.g., control plane 103 of FIG. 1) may receive such a request. According to one embodiment, the process of migrating a customer tenancy includes two phases: labeled as phase I and phase II, respectively. The phase II of migrating the customer tenancy further includes two iterative steps denoted as phase II iteration 1, and phase II iteration 2. In what follows, FIG. 2 depicts on a high-level, the operations included in each of the phases of the migration process. Details pertaining to each of the migration phases are described later with reference to FIGS. 3A and 3B, respectively. As shown in FIG. 2, phase I of migrating the customer tenancy includes two steps i.e., steps 203 and 205, respectively.

In step 203, the first IAM system obtains a snapshot of a customer tenancy from a first data storage e.g., object storage 109 of FIG. 1. The process in step 205 migrates i.e., transfers, the obtained snapshot of the customer tenancy to the second IAM system. Upon completion of migrating the snapshot obtained from the first data storage, phase I of the migration process is completed. Thereafter, the process commences phase II of the migration process. Specifically, as shown in FIG. 2, steps 207 and 209 are included in a first iteration of the second phase (i.e., phase II) of the migration process.

In step 207, the first IAM system obtains a second snapshot of the customer tenancy from a second data storage of the IAM system. It is noted that the second data storage is different than the first data storage. For instance, by one embodiment, the second snapshot of the customer tenancy is obtained from a buffer that is included in a persistent data storage of the first IAM system e.g., tenant buffer 104 included in the persistent data storage 105 as shown in FIG. 1. The process in step 209 migrates i.e., transfers, the obtained second snapshot of the customer tenancy to the second IAM system. Upon completion of migrating the second snapshot obtained from the second data storage, iteration 1 of phase II of the migration process is completed. Thereafter, the process commences with iteration 2 of phase II of the migration process. As shown in FIG. 2, iteration 2 of the second phase of the migration process includes steps 211, 213, and 215, respectively.

The process in step 211 modifies a state of a lock associated with the second data storage. For example, the state of the lock associated with the persistent data storage of the first IAM system is modified to reflect that the persistent data storage is maintained in a locked state. The process then proceeds to step 213, where a third snapshot of the customer tenancy is obtained from the second data storage. The process in step 215 migrates i.e., transfers, the obtained third snapshot of the customer tenancy to the second IAM system. Upon completion of migrating the third snapshot that is obtained from the second data storage, iteration 2 of phase II of the migration process is completed. Thereafter, in step 217 the first IAM system transmits a signal to the second IAM system notifying the second IAM system as being an authoritative source with respect to the migrated customer tenancy. In other words, upon completion of migrating the customer tenancy to the second IAM system, any new request(s) with respect to the migrated customer tenancy is/are directed to a control plane of the second IAM system.

Figure 3A:
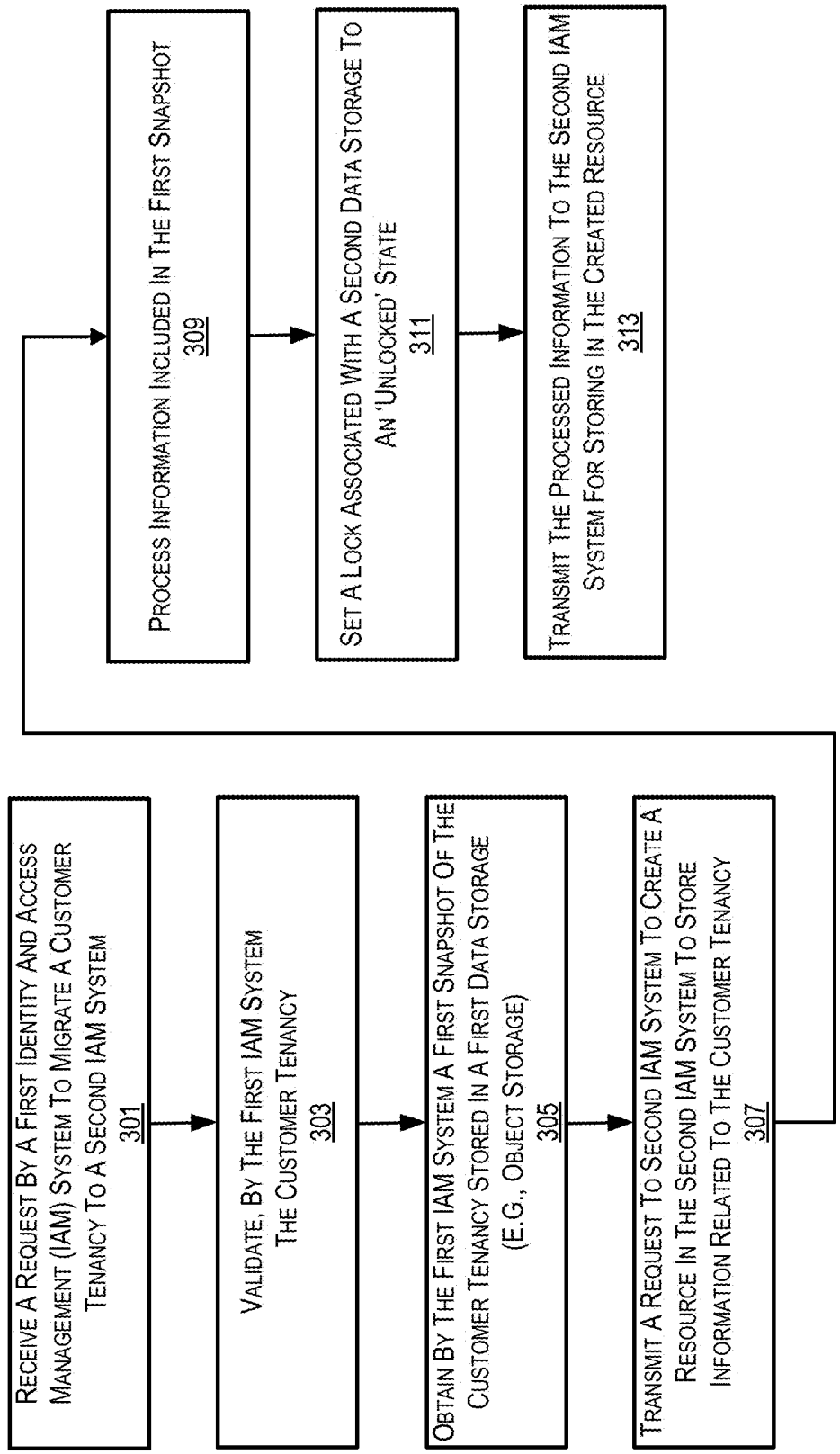
FIG. 3A depicts a flowchart illustrating steps performed in a first phase of migrating a customer tenancy from the first IAM system to the second IAM system in accordance with various embodiments.

FIG. 3A depicts a flowchart illustrating steps performed in a first phase of migrating a customer tenancy from the first IAM system to the second IAM system in accordance with various embodiments. The processing depicted in FIG. 3A may be implemented in software (e.g., code, instructions, program) executed by one or more processing units (e.g., processors, cores) of the respective systems, using hardware or combinations thereof. The software may be stored on a non-transitory storage medium (e.g., on a memory device). The method presented in FIG. 3A and described below is intended to be illustrative and non-limiting. Although FIG. 3A depicts the various processing steps occurring in a particular sequence or order, this is not intended to be limiting. In certain alternative embodiments, the processing may be performed in some different order or some steps may also be performed in parallel. For the sake of illustration, the steps of the flowchart of FIG. 3A are described with reference to a customer tenancy being migrated from the first IAM system (e.g., IAM system 101 of FIG. 1) to the second IAM system (e.g., IDCS system 131 of FIG. 1).

The process commences in step 301, where the first IAM system receives a request to migrate a customer tenancy to the second IAM system. It is noted that a control plane of the first IAM system (e.g., control plane 103 of FIG. 1) may receive such a request. In step 303, the customer tenancy in the first IAM system is validated. For instance, the first IAM system may validate credentials associated with the customer tenancy, ensure that the customer has sufficient privileges (e.g., administrative rights) to issue a migration request, etc.

The process then moves to step 305, where the first IAM system obtains a snapshot of the customer tenancy from a first data storage e.g., object storage 109 of FIG. 1. For example, referring to FIG. 1, a migration module 117 included in the control plane 103 of the first IAM system obtains a snapshot of the customer tenancy from the object storage 109. It is appreciated that the snapshot generator 115 included in the control plane 103 of the first IAM system may be configured to capture snapshots of the customer tenancy at predetermined time instances (e.g., every few seconds or minutes) from the persistent data storage of the first IAM system and store the captured snapshots in the object storage.

In step 307, the first IAM system transmits a request to the second IAM system to create a resource in the second IAM system to store information related to the customer tenancy. For instance, by one embodiment, the migration module 117 included in the control plane 103 of the first IAM system transmits a request to the control plane of the second IAM system (e.g., IDCS control plane 133). The request informs the second IAM system to create a resource e.g., a stripe in the second IAM system in order to store information related to the customer tenancy that is to be migrated.

Thereafter, the process moves to step 309, where information included in the first snapshot of the customer tenancy (obtained in step 305) is processed. According to one embodiment, the migration module 117 included in the control plane 103 of the first IAM system processes information included in the snapshot obtained in step 305. Processing information may relate to converting a first format of the information included in the snapshot to a second format that is acceptable by the second IAM system.

The process in step 311 sets a lock associated with a second data storage of the first IAM system to be in an 'unlocked' state. For instance, the lock associated with the persistent data storage 105 of the first IAM system is maintained in an unlocked state, thereby allowing new request(s) that are directed to the customer tenancy to be stored in a buffer (e.g., tenant buffer 104) included in the persistent data storage 105 of the first IAM system. In step 313, the first IAM system transmits the processed information (i.e., information of step 309) to the second IAM system for being stored in the resource created (in step 307) in the second IAM system. Upon transmitting the information included in the snapshot to the second IAM system, the first phase of migrating the customer tenancy from the first IAM system to the second IAM system is completed.

Figure 3B:
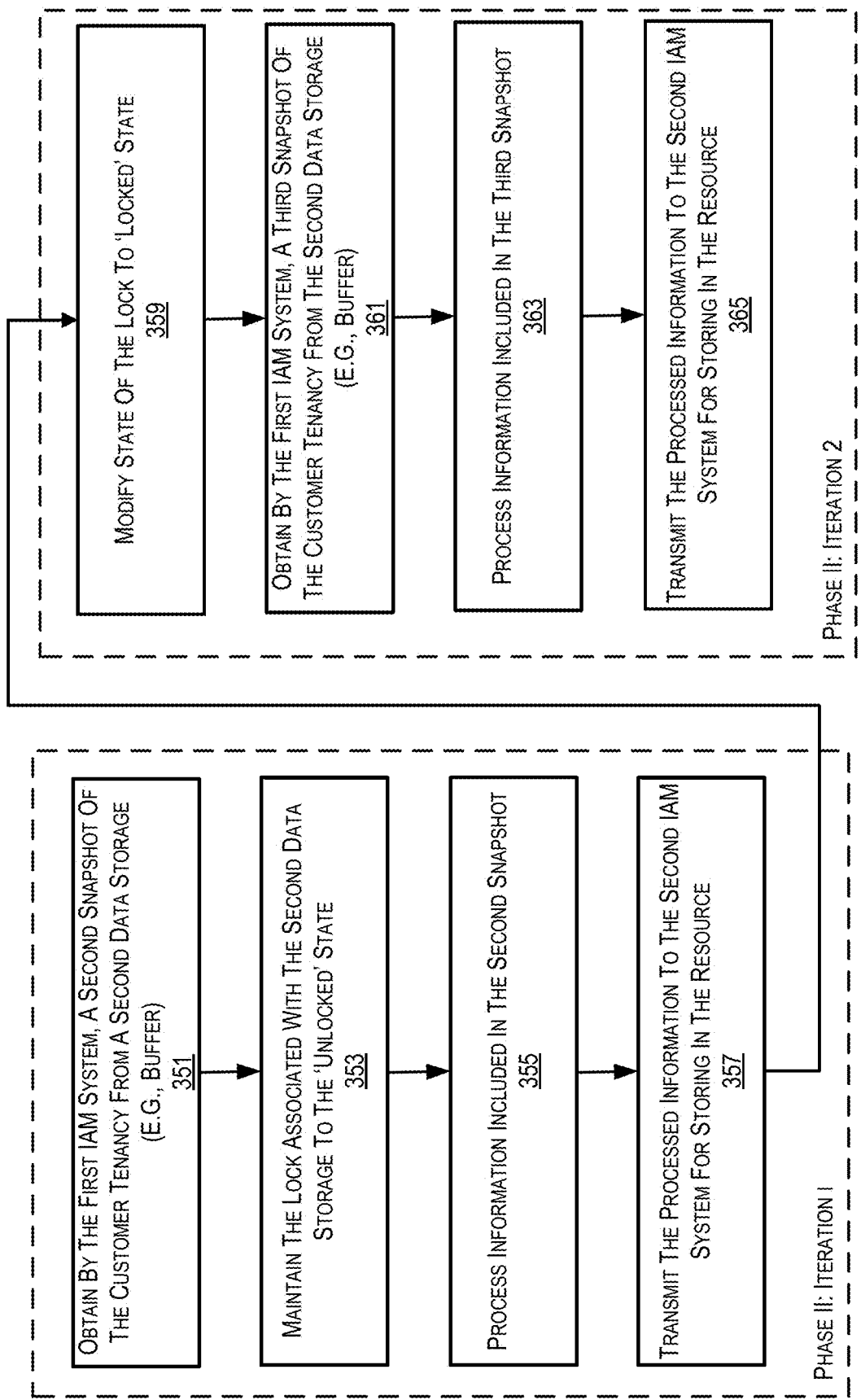
FIG. 3B depicts a flowchart illustrating steps performed in a second phase of migrating a customer tenancy from the first IAM system to the second IAM system in accordance with various embodiments.

FIG. 3B depicts a flowchart illustrating steps performed in a second phase of migrating a customer tenancy from the first IAM system to the second IAM system in accordance with various embodiments. The processing depicted in FIG. 3B may be implemented in software (e.g., code, instructions, program) executed by one or more processing units (e.g., processors, cores) of the respective systems, using hardware or combinations thereof. The software may be stored on a non-transitory storage medium (e.g., on a memory device). The method presented in FIG. 3B and described below is intended to be illustrative and non-limiting. Although FIG. 3B depicts the various processing steps occurring in a particular sequence or order, this is not intended to be limiting. In certain alternative embodiments, the processing may be performed in some different order or some steps may also be performed in parallel. For the sake of illustration, the steps of the flowchart of FIG. 3B are described with reference to a customer tenancy being migrated from the first IAM system (e.g., IAM system 101 of FIG. 1) to the second IAM system (e.g., IDCS system 131 of FIG. 1).

According to some embodiments, the second phase of migrating the customer tenancy from the first IAM system to the second IAM system includes two iterations. As shown in FIG. 3B, steps 351, 353, 355, and 357 are included in a first iteration of the second phase of migration whereas steps 359, 361, 363, and 365 are included in a second iteration of the second phase of migration process. The process commences in step 351, where a second snapshot of the customer tenancy is obtained from a second data storage e.g., tenant buffer included in the persistent storage of the first IAM system. In step 353, the first IAM system maintains the state of the lock associated with the second data storage in an 'unlocked state'. Doing so provisions for new incoming requests directed to the customer tenancy to be handled by the first IAM system, while the first IAM system is in the process of migrating the customer tenancy, thereby resulting in no loss of information.

In step 355, information included in the second snapshot of the customer tenancy (obtained in step 351) is processed. According to one embodiment, the migration module 117 included in the control plane 103 of the first IAM system processes information included in the snapshot obtained in step 351. Processing information may correspond to converting a first format of the information included in the snapshot to a second format that is acceptable by the second IAM system. In step 357, the first IAM system transmits the processed information (i.e., information of step 355) to the second IAM system for being stored in the resource created (in step 307 of FIG. 3A) in the second IAM system. Upon transmitting the information included in the second snapshot to the second IAM system, the first iteration of the second phase of migrating the customer tenancy from the first IAM system to the second IAM system is completed.

The second iteration of the second phase of migration commences in step 359, where the state of the lock associated with the second data storage is modified to be in a locked state. In step 361, a third snapshot of the customer tenancy is obtained from the second data storage e.g., tenant buffer included in the persistent storage of the first IAM system. The process then moves to step 363, where information included in the third snapshot is processed in a manner similar to that as described previously with reference to step 355. Further, in step 365, the first IAM system migrates the processed information of the third snapshot to the second IAM system for storage purposes.

By some embodiments, in the above-described process of migrating customer tenancies from the first IAM system to the second IAM system, it is noted that a copy of the information included in the snapshots of customer tenancy is migrated to the second IAM system. The first IAM system continues to maintain (i.e., store) information pertaining to the customer tenancy in its persistent storage. This provides the migration framework the advantageous ability to perform a reverse migration operation in a seamless manner. Details pertaining to the reverse migration process are described next with reference to FIG. 4B.

According to one embodiment, a number of events included in the third snapshot are considerably lower than a number of events included in the first or second snapshot. Specifically, the number of events included in the third snapshot correspond to a number of events (e.g., new requests directed to the customer tenancy) that occur after the second snapshot has been migrated to the second IAM system and before modifying the lock on the second data storage of the first IAM system. Further, it is appreciated that in the first phase of migration as well as in the first iteration of the second phase of migration, requests directed to the customer tenancy continue to be handled (and processed) by the first IAM system. Only upon instantiating the lock on the second data storage, new requests directed to the customer tenancy may be dropped. In this manner, the migration process as described above provides a low amount of downtime while migrating customer tenancies.

Turning to FIG. 3C, there is depicted a table illustrating migration phases, including a data source from which a snapshot of a customer tenancy is obtained in each phase, a status of a lock associated with the persistent data storage of the first IAM system, a status of the migration process, and an authoritative source of the customer tenancy in accordance with various embodiments. As depicted in FIG. 3C, the first IAM system is deemed as the authoritative source with respect to the customer tenancy in the first phase of the migration process as well as in the first iteration of the second phase of migration. Upon completing the migration of the third snapshot of the customer tenancy (i.e., in iteration 2 of the second phase), the second IAM system is deemed as the authoritative source with respect to the customer tenancy. It is noted that the authoritative source with respect to the customer tenancy is the IAM system that receives (and processes) requests directed to the customer tenancy in the migration process.

Figure 4A:
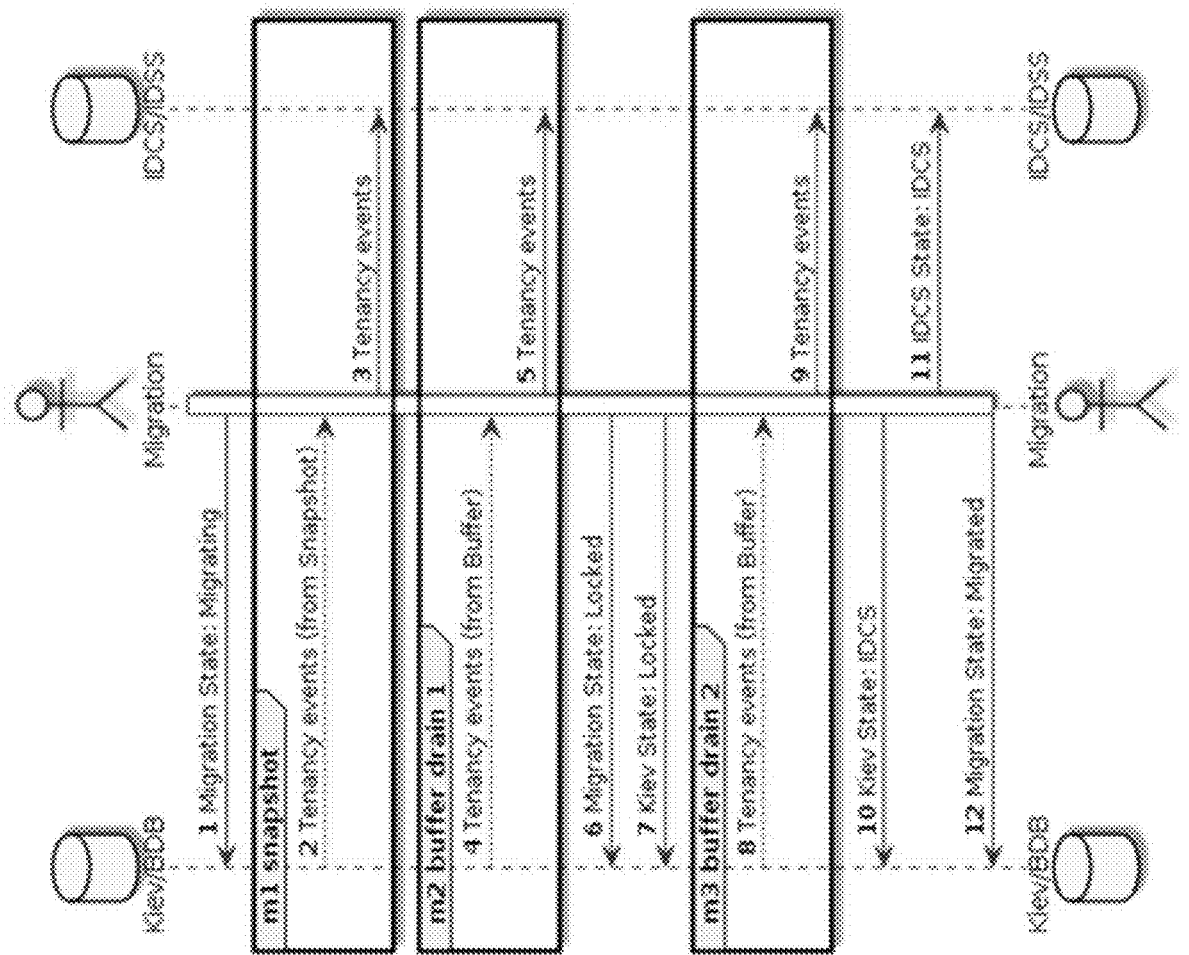
FIG. 4A depicts a flow diagram illustrating sequence of operations in a migration process in accordance with various embodiments.
Figure 4B:
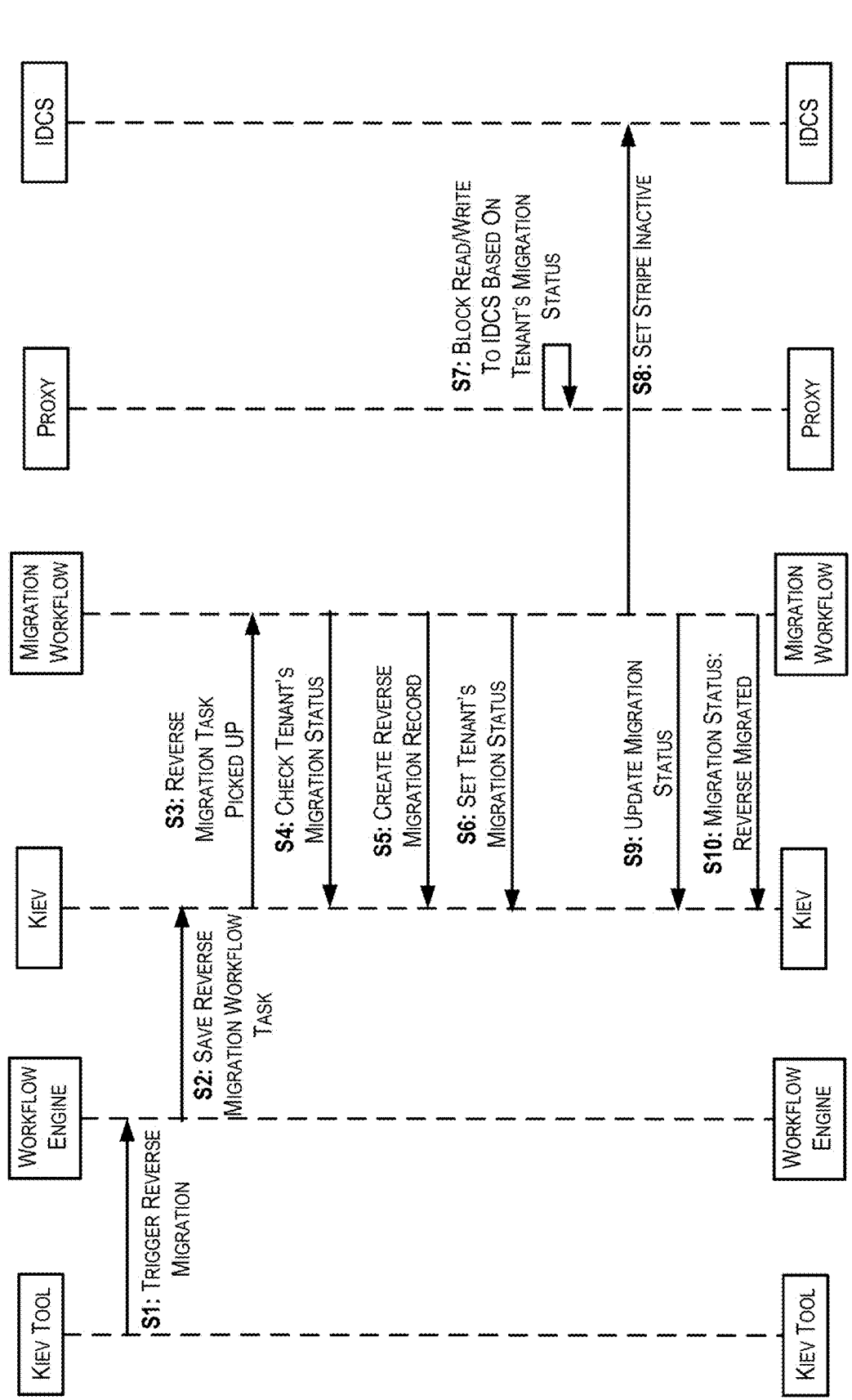
FIG. 4B depicts a flow diagram illustrating sequence of operations in a reverse migration process in accordance with some embodiments.

FIG. 4A depicts a flow diagram illustrating sequence of operations in a migration process in accordance with various embodiments. Specifically, the sequence diagram of FIG. 4B depicts the high-level phases of migration with a focus on state updates. For the sake of simplicity, the persistent storage of the IAM system and the in-memory database (e.g., BDB database included in a data plane of the first IAM system) as well as the corresponding data storage units of associated with the second IAM system i.e., IDCS/IDSS are combined for simplicity. By some embodiments, a user e.g., system administrator of a customer tenancy, may initiate or schedule migration of a customer tenancy via a tool included in the first IAM system e.g., Kiev Tool.

In step (1) a migration module (e.g., migration module 117 of FIG. 1) sets a state of a migration workflow to "migrating" with respect to a customer tenancy. In steps (2) and (3), a first phase of migration is performed i.e., phase I. Specifically, in step (2), the migration module obtains a snapshot (e.g., first snapshot) of the customer tenancy from an object storage. In step (3), the migration module transmits a request to the IDCS control plane to create a stripe i.e., a resource for this customer tenancy, wherein the obtained snapshot is to be migrated.

In steps (4) and (5), the migration module commences the second phase of migration i.e., phase II. Specifically, the migration module executes a first iteration of phase II of the migration process. In the first iteration, the migration module in step (4), obtains a snapshot (e.g., a second snapshot) of the customer tenancy from the tenant buffer. Upon obtaining the snapshot from the tenant buffer, the migration module in step (5), transmits the snapshot to the IDCS control plane in order to store information associated with the customer tenancy in the resource created in the IDCS system.

Once the migration module completes the transfer of information included in the second snapshot, the migration module updates a state of a write lock, i.e., a lock status associated with the persistent storage of the IAM system i.e., Kiev database. Specifically, the migration module updates the state of the lock to a locked state. In doing so, no further customer requests are logged in the tenant buffer. Upon changing the status of the write lock, the migration module in step (8), commences the second iteration of phase II. In the second iteration, the migration module processes the tenant buffer to migrate any events that may have stored in the buffer, while the first iteration of phase II was being performed and prior to the write lock being set to the locked state. In step (9), any remaining events in the tenant buffer are migrated to the IDCS system. Upon completing the second iteration of phase II of the migration process, the migration module in step (10) notifies the persistent data storage of the IAM i.e., Kiev DB that the IDCS system is now the authoritative source with respect to the customer tenancy. Additionally, in step (11), the migration module also notifies the IDCS system that it has been assigned to serve new customer requests with respect to the migrated tenancy. In step (12), the migration module sets the status of the migration workflow as "migrated" indicating that the complete customer tenancy has been migrated from the IAM system to the IDCS system.

Upon migrating a customer tenancy from the IAM system to the IDCS system, customer requests with respect to the migrated tenancy are directed to the control plane of the IDCS system. However, there may be instances where customers face issues with respect to the migrated data and or resources associated with the IDCS system (e.g., the customer cannot issue requests to the IDCS control plane in a successful manner, and/or customer cannot access tenancy). In such cases, there needs to be a provision to handle customer requests in a seamless manner.

By some embodiments, the migration module performs a reverse migration operation on the previously migrated customer tenancy. Reverse migration is defined herein as an operation where the control to handle customer requests is being shifted from the IDCS system back to the IAM system. It is noted that while migrating the customer tenancy, a snapshot of the customer tenancy is obtained from the IAM system and migrated to the IDCS system. The original information pertaining to the customer tenancy is still maintained in the IAM system. As such, in performing a reverse migration operation, only the control to handle customer requests (with respect to the customer tenancy) is shifted from the IDCS system to the IAM system.

FIG. 4B depicts a flow diagram illustrating sequence of operations in a reverse migration process in accordance with some embodiments. As shown in FIG. 4B, the reverse migration process is initiated by a Kiev tool in step S1. The Kiev tool triggers a workflow engine in the control plane to commence the reverse migration process. In step S2, the workflow engine saves the request for reverse migration as a task in the persistent data storage i.e., Kiev. In step S3, the migration workflow (i.e., component included in a control plane of the IAM system) obtains the request for reverse migration.

In step S4, the migration workflow performs a query to determine whether a migration status of the customer tenancy in consideration was previously set to "migrated". In other words, the migration workflow determines if the customer tenancy was previously migrated to the IDCS system. If the response to the query is affirmative, then the process moves to step S5, else the process of reverse migration is terminated.

In steps S5 and S6, the migration workflow creates a record for the customer tenancy as being reverse migrated and sets the migration status for the customer tenancy as "reverse migrating". The process then moves to step S7, where a proxy server blocks read and write requests to the customer tenancy in the control plane of the IDCS system. In step S8, the migration workflow deletes the stripe in the IDCS system corresponding to the customer tenancy. In step S9, the migration workflow sets a status of the customer tenancy to "null," indicating that a migrated version of customer tenancy does not exist in the IDCS system, and eventually, sets the status of the migration workflow for the customer tenancy as being 'reverse migrated' in step S10. Upon being reverse migrated, all new customer requests with respect to the customer tenancy in consideration are handled by the control plane of the IAM system.

Example Infrastructure as Service Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware, such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 5:
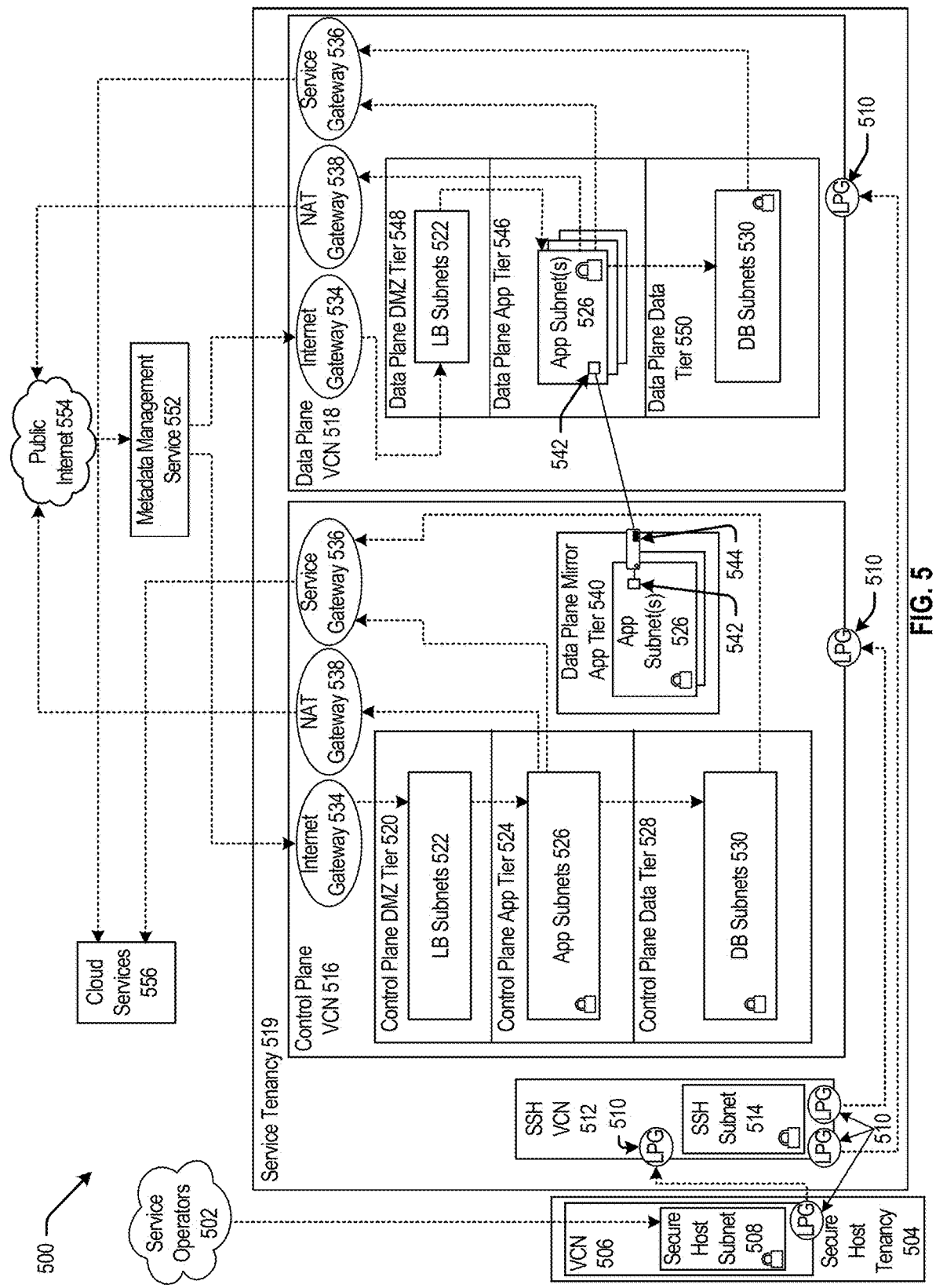
FIG. 5 is a block diagram illustrating one pattern for implementing a cloud infrastructure as a service system, according to at least one embodiment.

FIG. 5 is a block diagram 500 illustrating an example pattern of an IaaS architecture, according to at least one embodiment. Service operators 502 can be communicatively coupled to a secure host tenancy 504 that can include a virtual cloud network (VCN) 506 and a secure host subnet 508. In some examples, the service operators 502 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software, such as Microsoft Windows Mobile®, and/or a variety of mobile operating systems, such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 506 and/or the Internet.

The VCN 506 can include a local peering gateway (LPG) 510 that can be communicatively coupled to a secure shell (SSH) VCN 512 via an LPG 510 contained in the SSH VCN 512. The SSH VCN 512 can include an SSH subnet 514, and the SSH VCN 512 can be communicatively coupled to a control plane VCN 516 via the LPG 510 contained in the control plane VCN 516. Also, the SSH VCN 512 can be communicatively coupled to a data plane VCN 518 via an LPG 510. The control plane VCN 516 and the data plane VCN 518 can be contained in a service tenancy 519 that can be owned and/or operated by the IaaS provider.

The control plane VCN 516 can include a control plane demilitarized zone (DMZ) tier 520 that acts as a perimeter network (e.g., portions of a corporate network between the corporate intranet and external networks). The DMZ-based servers may have restricted responsibilities and help keep security breaches contained. Additionally, the DMZ tier 520 can include one or more load balancer (LB) subnet(s) 522, a control plane app tier 524 that can include app subnet(s) 526, a control plane data tier 528 that can include database (DB) subnet(s) 530 (e.g., frontend DB subnet(s) and/or backend DB subnet(s)). The LB subnet(s) 522 contained in the control plane DMZ tier 520 can be communicatively coupled to the app subnet(s) 526 contained in the control plane app tier 524 and an Internet gateway 534 that can be contained in the control plane VCN 516, and the app subnet(s) 526 can be communicatively coupled to the DB subnet(s) 530 contained in the control plane data tier 528 and a service gateway 536 and a network address translation (NAT) gateway 538. The control plane VCN 516 can include the service gateway 536 and the NAT gateway 538.

The control plane VCN 516 can include a data plane mirror app tier 540 that can include app subnet(s) 526. The app subnet(s) 526 contained in the data plane mirror app tier 540 can include a virtual network interface controller (VNIC) 542 that can execute a compute instance 544. The compute instance 544 can communicatively couple the app subnet(s) 526 of the data plane mirror app tier 540 to app subnet(s) 526 that can be contained in a data plane app tier 546.

The data plane VCN 518 can include the data plane app tier 546, a data plane DMZ tier 548, and a data plane data tier 550. The data plane DMZ tier 548 can include LB subnet(s) 522 that can be communicatively coupled to the app subnet(s) 526 of the data plane app tier 546 and the Internet gateway 534 of the data plane VCN 518. The app subnet(s) 526 can be communicatively coupled to the service gateway 536 of the data plane VCN 518 and the NAT gateway 538 of the data plane VCN 518. The data plane data tier 550 can also include the DB subnet(s) 530 that can be communicatively coupled to the app subnet(s) 526 of the data plane app tier 546.

The Internet gateway 534 of the control plane VCN 516 and of the data plane VCN 518 can be communicatively coupled to a metadata management service 552 that can be communicatively coupled to public Internet 554. Public Internet 554 can be communicatively coupled to the NAT gateway 538 of the control plane VCN 516 and of the data plane VCN 518. The service gateway 536 of the control plane VCN 516 and of the data plane VCN 518 can be communicatively couple to cloud services 556.

In some examples, the service gateway 536 of the control plane VCN 516 or of the data plane VCN 518 can make application programming interface (API) calls to cloud services 556 without going through public Internet 554. The API calls to cloud services 556 from the service gateway 536 can be one-way: the service gateway 536 can make API calls to cloud services 556, and cloud services 556 can send requested data to the service gateway 536. But, cloud services 556 may not initiate API calls to the service gateway 536.

In some examples, the secure host tenancy 504 can be directly connected to the service tenancy 519, which may be otherwise isolated. The secure host subnet 508 can communicate with the SSH subnet 514 through an LPG 510 that may enable two-way communication over an otherwise isolated system. Connecting the secure host subnet 508 to the SSH subnet 514 may give the secure host subnet 508 access to other entities within the service tenancy 519.

The control plane VCN 516 may allow users of the service tenancy 519 to set up or otherwise provision desired resources. Desired resources provisioned in the control plane VCN 516 may be deployed or otherwise used in the data plane VCN 518. In some examples, the control plane VCN 516 can be isolated from the data plane VCN 518, and the data plane mirror app tier 540 of the control plane VCN 516 can communicate with the data plane app tier 546 of the data plane VCN 518 via VNICs 542 that can be contained in the data plane mirror app tier 540 and the data plane app tier 546.

In some examples, users of the system, or customers, can make requests, for example, create, read, update, or delete (CRUD) operations, through public Internet 554 that can communicate the requests to the metadata management service 552. The metadata management service 552 can communicate the request to the control plane VCN 516 through the Internet gateway 534. The request can be received by the LB subnet(s) 522 contained in the control plane DMZ tier 520. The LB subnet(s) 522 may determine that the request is valid, and in response to this determination, the LB subnet(s) 522 can transmit the request to app subnet(s) 526 contained in the control plane app tier 524. If the request is validated and requires a call to public Internet 554, the call to public Internet 554 may be transmitted to the NAT gateway 538 that can make the call to public Internet 554. Memory that may be desired to be stored by the request can be stored in the DB subnet(s) 530.

In some examples, the data plane mirror app tier 540 can facilitate direct communication between the control plane VCN 516 and the data plane VCN 518. For example, changes, updates, or other suitable modifications to configuration may be desired to be applied to the resources contained in the data plane VCN 518. Via a VNIC 542, the control plane VCN 516 can directly communicate with, and can thereby execute the changes, updates, or other suitable modifications to configuration to, resources contained in the data plane VCN 518.

In some embodiments, the control plane VCN 516 and the data plane VCN 518 can be contained in the service tenancy 519. In this case, the user, or the customer, of the system may not own or operate either the control plane VCN 516 or the data plane VCN 518. Instead, the IaaS provider may own or operate the control plane VCN 516 and the data plane VCN 518, both of which may be contained in the service tenancy 519. This embodiment can enable isolation of networks that may prevent users or customers from interacting with other users', or other customers', resources. Also, this embodiment may allow users or customers of the system to store databases privately without needing to rely on public Internet 654, which may not have a desired level of security, for storage.

In other embodiments, the LB subnet(s) 522 contained in the control plane VCN 516 can be configured to receive a signal from the service gateway 536. In this embodiment, the control plane VCN 516 and the data plane VCN 518 may be configured to be called by a customer of the IaaS provider without calling public Internet 554. Customers of the IaaS provider may desire this embodiment since database(s) that the customers use may be controlled by the IaaS provider and may be stored on the service tenancy 519, which may be isolated from public Internet 554.

Figure 6:
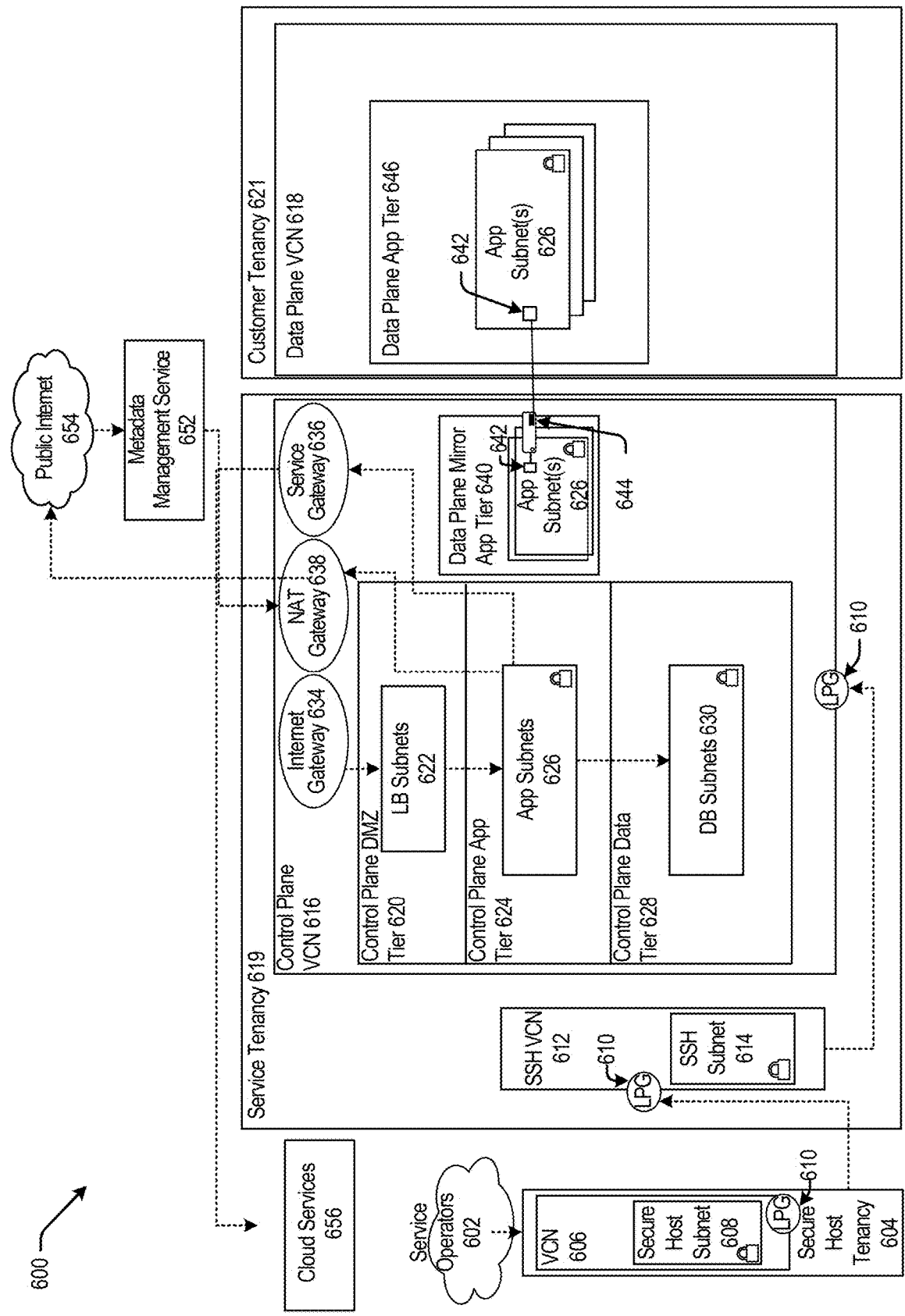
FIG. 6 is a block diagram illustrating another pattern for implementing a cloud infrastructure as a service system, according to at least one embodiment.

FIG. 6 is a block diagram 600 illustrating another example pattern of an IaaS architecture, according to at least one embodiment. Service operators 602 (e.g. service operators 502 of FIG. 5) can be communicatively coupled to a secure host tenancy 604 (e.g. the secure host tenancy 504 of FIG. 5) that can include a virtual cloud network (VCN) 606 (e.g. the VCN 506 of FIG. 5) and a secure host subnet 608 (e.g. the secure host subnet 508 of FIG. 5). The VCN 606 can include a local peering gateway (LPG) 610 (e.g. the LPG 510 of FIG. 5) that can be communicatively coupled to a secure shell (SSH) VCN 612 (e.g. the SSH VCN 512 of FIG. 5) via an LPG 510 contained in the SSH VCN 612. The SSH VCN 612 can include an SSH subnet 614 (e.g. the SSH subnet 514 of FIG. 5), and the SSH VCN 612 can be communicatively coupled to a control plane VCN 616 (e.g. the control plane VCN 516 of FIG. 5) via an LPG 610 contained in the control plane VCN 616. The control plane VCN 616 can be contained in a service tenancy 619 (e.g. the service tenancy 519 of FIG. 5), and the data plane VCN 618 (e.g. the data plane VCN 518 of FIG. 5) can be contained in a customer tenancy 621 that may be owned or operated by users, or customers, of the system.

The control plane VCN 616 can include a control plane DMZ tier 620 (e.g. the control plane DMZ tier 520 of FIG. 5) that can include LB subnet(s) 622 (e.g. LB subnet(s) 522 of FIG. 5), a control plane app tier 624 (e.g. the control plane app tier 524 of FIG. 5) that can include app subnet(s) 626 (e.g. app subnet(s) 526 of FIG. 5), a control plane data tier 628 (e.g. the control plane data tier 528 of FIG. 5) that can include database (DB) subnet(s) 630 (e.g. similar to DB subnet(s) 530 of FIG. 5). The LB subnet(s) 622 contained in the control plane DMZ tier 620 can be communicatively coupled to the app subnet(s) 626 contained in the control plane app tier 624 and an Internet gateway 634 (e.g. the Internet gateway 534 of FIG. 5) that can be contained in the control plane VCN 616, and the app subnet(s) 626 can be communicatively coupled to the DB subnet(s) 630 contained in the control plane data tier 628 and a service gateway 636 (e.g. the service gateway of FIG. 5) and a network address translation (NAT) gateway 638 (e.g. the NAT gateway 538 of FIG. 5). The control plane VCN 616 can include the service gateway 636 and the NAT gateway 638.

The control plane VCN 616 can include a data plane mirror app tier 640 (e.g. the data plane mirror app tier 540 of FIG. 5) that can include app subnet(s) 626. The app subnet(s) 626 contained in the data plane mirror app tier 640 can include a virtual network interface controller (VNIC) 642 (e.g. the VNIC of 542) that can execute a compute instance 644 (e.g. similar to the compute instance 544 of FIG. 5). The compute instance 644 can facilitate communication between the app subnet(s) 626 of the data plane mirror app tier 640 and the app subnet(s) 626 that can be contained in a data plane app tier 646 (e.g. the data plane app tier 546 of FIG. 5) via the VNIC 642 contained in the data plane mirror app tier 640 and the VNIC 642 contained in the data plane app tier 646.

The Internet gateway 634 contained in the control plane VCN 616 can be communicatively coupled to a metadata management service 652 (e.g. the metadata management service 552 of FIG. 5) that can be communicatively coupled to public Internet 654 (e.g. public Internet 554 of FIG. 5). Public Internet 654 can be communicatively coupled to the NAT gateway 638 contained in the control plane VCN 616. The service gateway 636 contained in the control plane VCN 616 can be communicatively couple to cloud services 656 (e.g. cloud services 556 of FIG. 5).

In some examples, the data plane VCN 618 can be contained in the customer tenancy 621. In this case, the IaaS provider may provide the control plane VCN 616 for each customer, and the IaaS provider may, for each customer, set up a unique compute instance 644 that is contained in the service tenancy 619. Each compute instance 644 may allow communication between the control plane VCN 616, contained in the service tenancy 619, and the data plane VCN 618 that is contained in the customer tenancy 621. The compute instance 644 may allow resources, that are provisioned in the control plane VCN 616 that is contained in the service tenancy 619, to be deployed or otherwise used in the data plane VCN 618 that is contained in the customer tenancy 621.

In other examples, the customer of the IaaS provider may have databases that live in the customer tenancy 621. In this example, the control plane VCN 616 can include the data plane mirror app tier 640 that can include app subnet(s) 626. The data plane mirror app tier 640 can reside in the data plane VCN 618, but the data plane mirror app tier 640 may not live in the data plane VCN 618. That is, the data plane mirror app tier 640 may have access to the customer tenancy 621, but the data plane mirror app tier 640 may not exist in the data plane VCN 618 or be owned or operated by the customer of the IaaS provider. The data plane mirror app tier 640 may be configured to make calls to the data plane VCN 618 but may not be configured to make calls to any entity contained in the control plane VCN 616. The customer may desire to deploy or otherwise use resources in the data plane VCN 618 that are provisioned in the control plane VCN 616, and the data plane mirror app tier 640 can facilitate the desired deployment, or other usage of resources, of the customer.

In some embodiments, the customer of the IaaS provider can apply filters to the data plane VCN 618. In this embodiment, the customer can determine what the data plane VCN 618 can access, and the customer may restrict access to public Internet 654 from the data plane VCN 618. The IaaS provider may not be able to apply filters or otherwise control access of the data plane VCN 618 to any outside networks or databases. Applying filters and controls by the customer onto the data plane VCN 618, contained in the customer tenancy 621, can help isolate the data plane VCN 618 from other customers and from public Internet 654.

In some embodiments, cloud services 656 can be called by the service gateway 636 to access services that may not exist on public Internet 654, on the control plane VCN 616, or on the data plane VCN 618. The connection between cloud services 656 and the control plane VCN 616 or the data plane VCN 618 may not be live or continuous. Cloud services 656 may exist on a different network owned or operated by the IaaS provider. Cloud services 656 may be configured to receive calls from the service gateway 636 and may be configured to not receive calls from public Internet 654. Some cloud services 656 may be isolated from other cloud services 656, and the control plane VCN 616 may be isolated from cloud services 656 that may not be in the same region as the control plane VCN 616. For example, the control plane VCN 616 may be located in "Region 1," and cloud service "Deployment 6," may be located in Region 1 and in "Region 2." If a call to Deployment 6 is made by the service gateway 636 contained in the control plane VCN 616 located in Region 1, the call may be transmitted to Deployment 6 in Region 1. In this example, the control plane VCN 616, or Deployment 6 in Region 1, may not be communicatively coupled to, or otherwise in communication with, Deployment 6 in Region 2.

Figure 7:
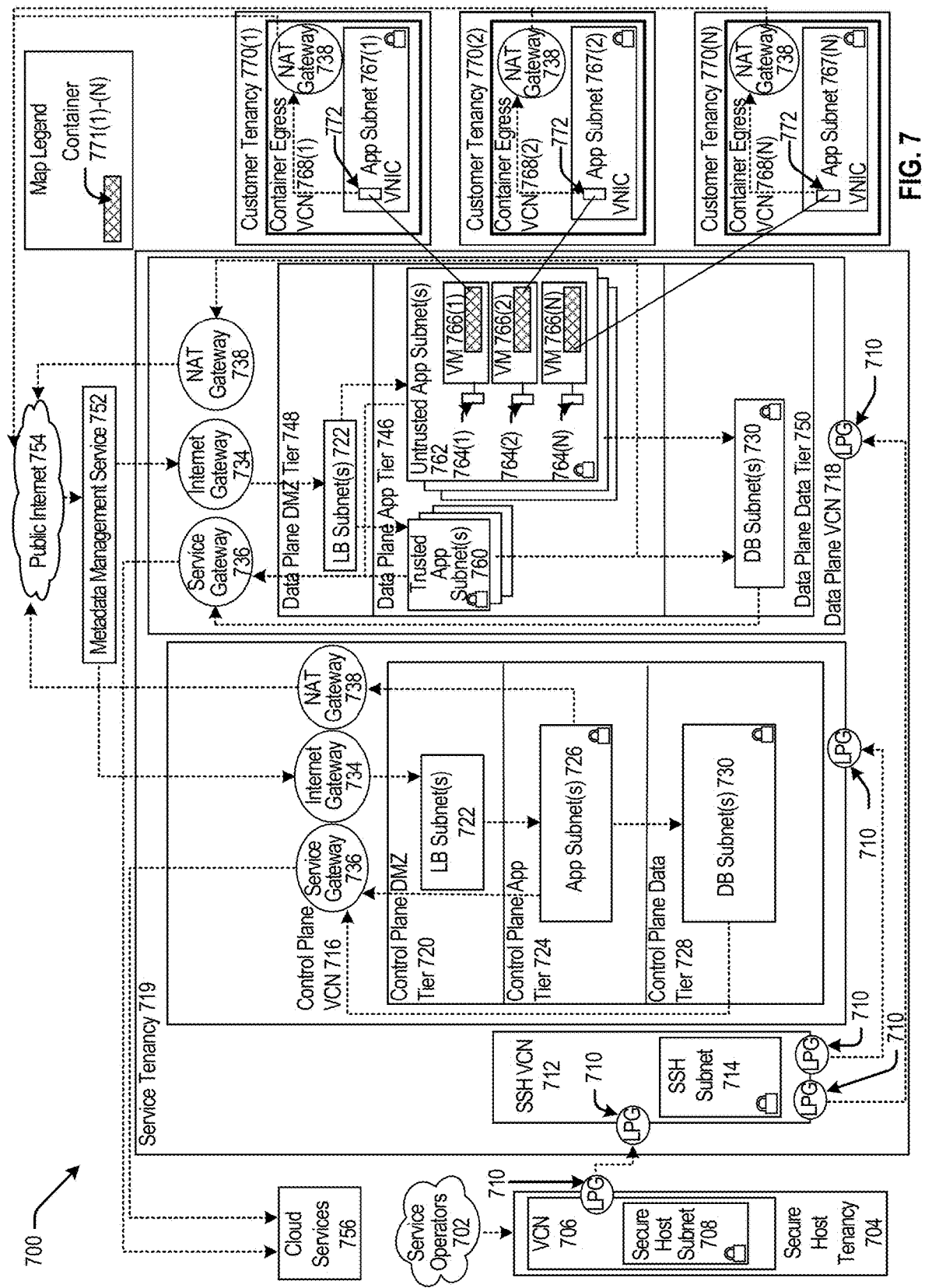
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 502 of FIG. 5) can be communicatively coupled to a secure host tenancy 704 (e.g. the secure host tenancy 504 of FIG. 5) that can include a virtual cloud network (VCN) 706 (e.g. the VCN 506 of FIG. 5) and a secure host subnet 708 (e.g. the secure host subnet 508 of FIG. 5). The VCN 706 can include an LPG 710 (e.g. the LPG 510 of FIG. 5) that can be communicatively coupled to an SSH VCN 712 (e.g. the SSH VCN 512 of FIG. 5) via an LPG 710 contained in the SSH VCN 712. The SSH VCN 712 can include an SSH subnet 714 (e.g. the SSH subnet 514 of FIG. 5), and the SSH VCN 712 can be communicatively coupled to a control plane VCN 716 (e.g. the control plane VCN 516 of FIG. 5) via an LPG 710 contained in the control plane VCN 716 and to a data plane VCN 718 (e.g. the data plane 518 of FIG. 5) via an LPG 710 contained in the data plane VCN 718. The control plane VCN 716 and the data plane VCN 718 can be contained in a service tenancy 719 (e.g. the service tenancy 519 of FIG. 5).

The control plane VCN 716 can include a control plane DMZ tier 720 (e.g. the control plane DMZ tier 520 of FIG.

5) that can include load balancer (LB) subnet(s) 722 (e.g. LB subnet(s) 522 of FIG. 5), a control plane app tier 724 (e.g. the control plane app tier 524 of FIG. 5) that can include app subnet(s) 726 (e.g. similar to app subnet(s) 526 of FIG. 5), a control plane data tier 728 (e.g. the control plane data tier 528 of FIG. 5) that can include DB subnet(s) 730. The LB subnet(s) 722 contained in the control plane DMZ tier 720 can be communicatively coupled to the app subnet(s) 726 contained in the control plane app tier 724 and to an Internet gateway 734 (e.g. the Internet gateway 534 of FIG. 5) that can be contained in the control plane VCN 716, and the app subnet(s) 726 can be communicatively coupled to the DB subnet(s) 730 contained in the control plane data tier 728 and to a service gateway 736 (e.g. the service gateway of FIG. 5) and a network address translation (NAT) gateway 738 (e.g. the NAT gateway 538 of FIG. 5). The control plane VCN 716 can include the service gateway 736 and the NAT gateway 738.

The data plane VCN 718 can include a data plane app tier 746 (e.g. the data plane app tier 546 of FIG. 5), a data plane DMZ tier 748 (e.g. the data plane DMZ tier 548 of FIG. 5), and a data plane data tier 750 (e.g. the data plane data tier 550 of FIG. 5). The data plane DMZ tier 748 can include LB subnet(s) 722 that can be communicatively coupled to trusted app subnet(s) 760 and untrusted app subnet(s) 762 of the data plane app tier 746 and the Internet gateway 734 contained in the data plane VCN 718. The trusted app subnet(s) 760 can be communicatively coupled to the service gateway 736 contained in the data plane VCN 718, the NAT gateway 738 contained in the data plane VCN 718, and DB subnet(s) 730 contained in the data plane data tier 750. The untrusted app subnet(s) 762 can be communicatively coupled to the service gateway 736 contained in the data plane VCN 718 and DB subnet(s) 730 contained in the data plane data tier 750. The data plane data tier 750 can include DB subnet(s) 730 that can be communicatively coupled to the service gateway 736 contained in the data plane VCN 718.

The untrusted app subnet(s) 762 can include one or more primary VNICs 764(1)-(N) that can be communicatively coupled to tenant virtual machines (VMs) 766(1)-(N). Each tenant VM 766(1)-(N) can be communicatively coupled to a respective app subnet 767(1)-(N) that can be contained in respective container egress VCNs 768(1)-(N) that can be contained in respective customer tenancies 770(1)-(N). Respective secondary VNICs 772(1)-(N) can facilitate communication between the untrusted app subnet(s) 762 contained in the data plane VCN 718 and the app subnet contained in the container egress VCNs 768(1)-(N). Each container egress VCNs 768(1)-(N) can include a NAT gateway 738 that can be communicatively coupled to public Internet 754 (e.g. public Internet 554 of FIG. 5).

The Internet gateway 734 contained in the control plane VCN 716 and contained in the data plane VCN 718 can be communicatively coupled to a metadata management service 752 (e.g. the metadata management system 552 of FIG. 5) that can be communicatively coupled to public Internet 754. Public Internet 754 can be communicatively coupled to the NAT gateway 738 contained in the control plane VCN 716 and contained in the data plane VCN 718. The service gateway 736 contained in the control plane VCN 716 and contained in the data plane VCN 718 can be communicatively couple to cloud services 756.

In some embodiments, the data plane VCN 718 can be integrated with customer tenancies 770. This integration can be useful or desirable for customers of the IaaS provider in some cases, such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 746. Code to run the function may be executed in the VMs 766(1)-(N), and the code may not be configured to run anywhere else on the data plane VCN 718. Each VM 766(1)-(N) may be connected to one customer tenancy 770. Respective containers 771(1)-(N) contained in the VMs 766(1)-(N) may be configured to run the code. In this case, there can be a dual isolation (e.g., the containers 771(1)-(N) running code, where the containers 771(1)-(N) may be contained in at least the VM 766(1)-(N) that are contained in the untrusted app subnet(s) 762), which may help prevent incorrect or otherwise undesirable code from damaging the network of the IaaS provider or from damaging a network of a different customer. The containers 771(1)-(N) may be communicatively coupled to the customer tenancy 770 and may be configured to transmit or receive data from the customer tenancy 770. The containers 771(1)-(N) may not be configured to transmit or receive data from any other entity in the data plane VCN 718. Upon completion of running the code, the IaaS provider may kill or otherwise dispose of the containers 771(1)-(N).

In some embodiments, the trusted app subnet(s) 760 may run code that may be owned or operated by the IaaS provider. In this embodiment, the trusted app subnet(s) 760 may be communicatively coupled to the DB subnet(s) 730 and be configured to execute CRUD operations in the DB subnet(s) 730. The untrusted app subnet(s) 762 may be communicatively coupled to the DB subnet(s) 730, but in this embodiment, the untrusted app subnet(s) may be configured to execute read operations in the DB subnet(s) 730. The containers 771(1)-(N) that can be contained in the VM 766(1)-(N) of each customer and that may run code from the customer may not be communicatively coupled with the DB subnet(s) 730.

In other embodiments, the control plane VCN 716 and the data plane VCN 718 may not be directly communicatively coupled. In this embodiment, there may be no direct communication between the control plane VCN 716 and the data plane VCN 718. However, communication can occur indirectly through at least one method. An LPG 710 may be established by the IaaS provider that can facilitate communication between the control plane VCN 716 and the data plane VCN 718. In another example, the control plane VCN 716 or the data plane VCN 718 can make a call to cloud services 756 via the service gateway 736. For example, a call to cloud services 756 from the control plane VCN 716 can include a request for a service that can communicate with the data plane VCN 718.

Figure 8:
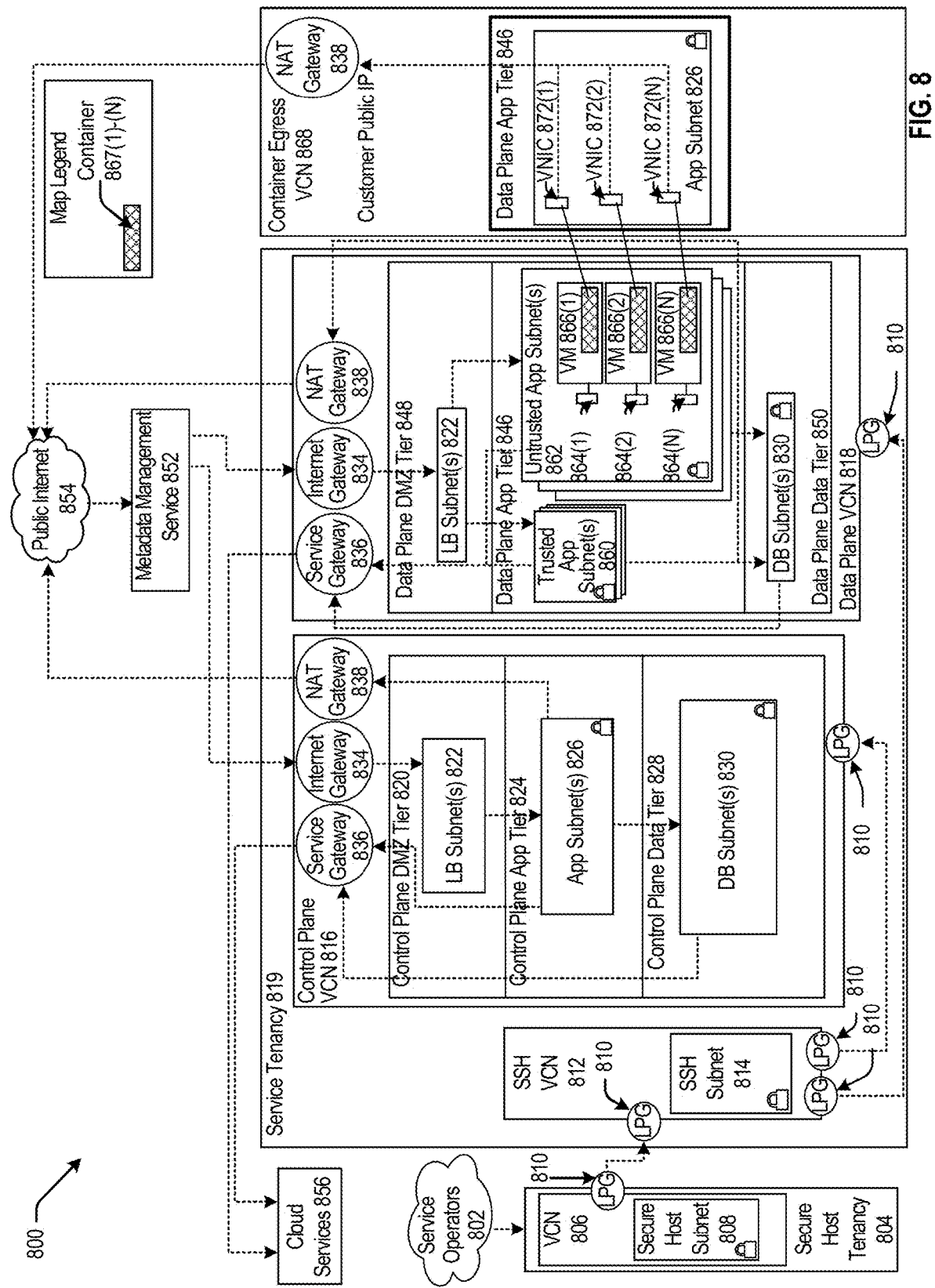
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 502 of FIG. 5) can be communicatively coupled to a secure host tenancy 804 (e.g. the secure host tenancy 504 of FIG. 5) that can include a virtual cloud network (VCN) 806 (e.g. the VCN 506 of FIG. 5) and a secure host subnet 808 (e.g. the secure host subnet 508 of FIG. 5). The VCN 806 can include an LPG 810 (e.g. the LPG 510 of FIG. 5) that can be communicatively coupled to an SSH VCN 812 (e.g. the SSH VCN 512 of FIG. 5) via an LPG 810 contained in the SSH VCN 812. The SSH VCN 812 can include an SSH subnet 814 (e.g. the SSH subnet 514 of FIG. 5), and the SSH VCN 812 can be communicatively coupled to a control plane VCN 816 (e.g. the control plane VCN 516 of FIG. 5) via an LPG 810 contained in the control plane VCN 816 and to a data plane VCN 818 (e.g. the data plane 518 of FIG. 5) via an LPG 810 contained in the data plane VCN 818. The control plane VCN 816 and the data plane VCN 818 can be contained in a service tenancy 819 (e.g. the service tenancy 519 of FIG. 5).

The control plane VCN 816 can include a control plane DMZ tier 820 (e.g. the control plane DMZ tier 520 of FIG. 5) that can include LB subnet(s) 822 (e.g. LB subnet(s) 522 of FIG. 5), a control plane app tier 824 (e.g. the control plane app tier 524 of FIG. 5) that can include app subnet(s) 826 (e.g. app subnet(s) 526 of FIG. 5), a control plane data tier 828 (e.g. the control plane data tier 528 of FIG. 5) that can include DB subnet(s) 830 (e.g. DB subnet(s) 730 of FIG. 7). The LB subnet(s) 822 contained in the control plane DMZ tier 820 can be communicatively coupled to the app subnet(s) 826 contained in the control plane app tier 824 and to an Internet gateway 834 (e.g. the Internet gateway 534 of FIG. 5) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 5) and a network address translation (NAT) gateway 838 (e.g. the NAT gateway 538 of FIG. 5). The control plane VCN 816 can include the service gateway 836 and the NAT gateway 838.

The data plane VCN 818 can include a data plane app tier 846 (e.g. the data plane app tier 546 of FIG. 5), a data plane DMZ tier 848 (e.g. the data plane DMZ tier 548 of FIG. 5), and a data plane data tier 850 (e.g. the data plane data tier 550 of FIG. 5). The data plane DMZ tier 848 can include LB subnet(s) 822 that can be communicatively coupled to trusted app subnet(s) 860 (e.g. trusted app subnet(s) 760 of FIG. 7) and untrusted app subnet(s) 862 (e.g. untrusted app subnet(s) 762 of FIG. 7) of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include primary VNICs 864(1)-(N) that can be communicatively coupled to tenant virtual machines (VMs) 866(1)-(N) residing within the untrusted app subnet(s) 862. Each tenant VM 866(1)-(N) can run code in a respective container 867(1)-(N), and be communicatively coupled to an app subnet 826 that can be contained in a data plane app tier 846 that can be contained in a container egress VCN 868. Respective secondary VNICs 872(1)-(N) can facilitate communication between the untrusted app subnet(s) 862 contained in the data plane VCN 818 and the app subnet contained in the container egress VCN 868. The container egress VCN can include a NAT gateway 838 that can be communicatively coupled to public Internet 854 (e.g. public Internet 554 of FIG. 5).

The Internet gateway 834 contained in the control plane VCN 816 and contained in the data plane VCN 818 can be communicatively coupled to a metadata management service 852 (e.g. the metadata management system 552 of FIG. 5) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some examples, the pattern illustrated by the architecture of block diagram 800 of FIG. 8 may be considered an exception to the pattern illustrated by the architecture of block diagram 600 of FIG. 6 and may be desirable for a customer of the IaaS provider if the IaaS provider cannot directly communicate with the customer (e.g., a disconnected region). The respective containers 867(1)-(N) that are contained in the VMs 866(1)-(N) for each customer can be accessed in real-time by the customer. The containers 867(1)-(N) may be configured to make calls to respective secondary VNICs 872(1)-(N) contained in app subnet(s) 826 of the data plane app tier 846 that can be contained in the container egress VCN 868. The secondary VNICs 872(1)-(N) can transmit the calls to the NAT gateway 838 that may transmit the calls to public Internet 854. In this example, the containers 867(1)-(N) that can be accessed in real-time by the customer can be isolated from the control plane VCN 816 and can be isolated from other entities contained in the data plane VCN 818. The containers 867(1)-(N) may also be isolated from resources from other customers.

In other examples, the customer can use the containers 867(1)-(N) to call cloud services 856. In this example, the customer may run code in the containers 867(1)-(N) that requests a service from cloud services 856. The containers 867(1)-(N) can transmit this request to the secondary VNICs 872(1)-(N) that can transmit the request to the NAT gateway that can transmit the request to public Internet 854. Public Internet 854 can transmit the request to LB subnet(s) 822 contained in the control plane VCN 816 via the Internet gateway 834. In response to determining the request is valid, the LB subnet(s) can transmit the request to app subnet(s) 826 that can transmit the request to cloud services 856 via the service gateway 836.

It should be appreciated that IaaS architectures 500, 600, 700, 800 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 9:
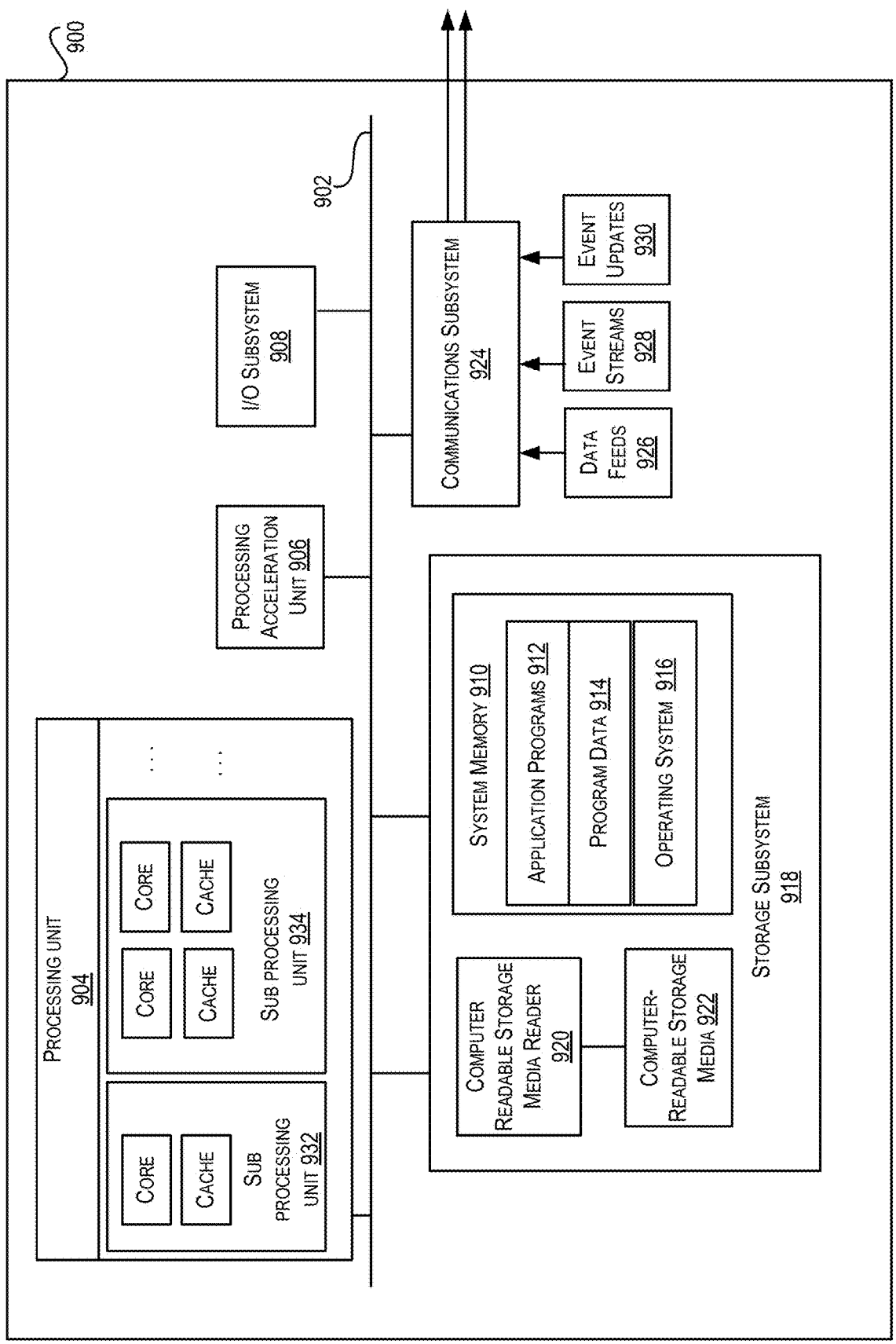
FIG. 9 is a block diagram illustrating an example computer system, according to at least one embodiment.

FIG. 9 illustrates an example computer system 900, in which various embodiments may be implemented. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem

924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices, such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices, such as the Microsoft Kinect® motion sensor that enables users to control and interact with an input device, such as the Microsoft Xbox® 360 game controller, through a natural user interface using gestures and spoken commands. User interface input devices may also include eye gesture recognition devices, such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices, such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices, such as computed tomography, magnetic resonance imaging, position emission tomography, medical ultrasonography devices. User interface input devices may also include, for example, audio input devices, such as MIDI keyboards, digital musical instruments and the like.

User interface output devices may include a display subsystem, indicator lights, or non-visual displays, such as audio output devices. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information, such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 910 may be volatile (such as random-access memory (RAM)), non-volatile (such as read-only memory (ROM), and/or flash memory) The RAM typically contains data and/or program modules that are immediately accessible to and/or presently being operated and executed by processing unit 904. In some implementations, system memory 910 may include multiple different types of memory, such as static random-access memory (SRAM) or dynamic random-access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems, such as iOS, Windows® Phone, Android® OS, BlackBerry® 10 OS, and Palm® OS operating systems.

Storage subsystem 918 may also provide a tangible computer-readable storage medium for storing the basic programming and data constructs that provide the functionality of some embodiments. Software (programs, code modules, instructions) that when executed by a processor provide the functionality described above may be stored in storage subsystem 918. These software modules or instructions may be executed by processing unit 904. Storage subsystem 918 may also provide a repository for storing data used in accordance with the present disclosure.

Storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media, such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer-readable media. This can also include nontangible computer-readable media, such as data signals, data transmissions, or any other medium which can be used to transmit the desired information and which can be accessed by computing system 900.

By way of example, computer-readable storage media 922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk, such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory, such as flash-memory based SSDs, enterprise flash drives, solid state ROM, and the like, SSDs based on volatile memory, such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 1000 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social networks and/or other communication services, such as Twitter® feeds, Facebook® updates, web feeds, such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language, such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   receiving, by a first identity and access management (IAM) system of a cloud service provider (CSP), a first request to migrate a customer tenancy from the first IAM system to a second IAM system of the CSP;
   obtaining, by the first IAM system, a first snapshot of the customer tenancy stored in a first data storage, wherein the customer tenancy includes information related to at least one or more user accounts, or credentials and resources associated with the one or more user accounts;
   migrating the first snapshot of the customer tenancy to the second IAM system;
   obtaining, by the first IAM system, a second snapshot of the customer tenancy from a second data storage, wherein the second data storage is different than the first data storage, and wherein each of the first data storage and the second data storage belong to the first IAM system;
   migrating the second snapshot of the customer tenancy to the second IAM system;
   modifying a state of a lock associated with the second data storage;
   obtaining a third snapshot of the customer tenancy from the second data storage;
   migrating the third snapshot of the customer tenancy to the second IAM system; and
   responsive to migrating the third snapshot, directing a second request regarding the customer tenancy to the second IAM system.

2. The method of claim 1, wherein the first data storage corresponds to an object storage and the second data storage corresponds to a persistent data storage of the first IAM system.

3. The method of claim 2, wherein each of the second snapshot and the third snapshot is obtained from a buffer included in the persistent data storage of the first IAM system.

4. The method of claim 1, wherein while migrating the first snapshot of the customer tenancy to the second IAM system, new requests directed to the customer tenancy are stored in the second data storage associated with the first IAM system.

5. The method of claim 1, wherein while migrating the second snapshot of the customer tenancy to the second IAM system, new requests directed to the customer tenancy are stored in the second data storage associated with the first IAM system.

6. The method of claim 1, further comprising:
sending, by the first IAM system, a creation request to the second IAM system to create a resource in the second IAM system to store information related to the customer tenancy.

7. The method of claim 1, wherein prior to the first IAM system migrating any one of the first snapshot, the second snapshot, or the third snapshot, the first IAM system is configured to convert a first format of information included therein to information in a second format that is acceptable by the second IAM system.

8. The method of claim 1, wherein the first IAM system of the CSP is different than the second IAM system of the CSP.

9. The method of claim 4, wherein the new requests directed to the customer tenancy correspond to operations that are to be executed with respect to one or more user accounts included in the customer tenancy.

10. The method of claim 1, wherein the step of migrating the first snapshot of the customer tenancy to the second IAM system further includes:
maintaining, by the first IAM system, the state of the lock associated with the second data storage in an unlocked state.

11. The method of claim 1, wherein the step of migrating the second snapshot of the customer tenancy to the second IAM system further includes:
maintaining, by the first IAM system, the state of the lock associated with the second data storage in an unlocked state.

12. The method of claim 1, wherein prior to obtaining the third snapshot of the customer tenancy, the first IAM system modifies the state of the lock to be in a locked state.

13. A non-transitory computer-readable medium storing specific computer-executable instructions that, when executed by a processor, cause a computer system to execute a method, the method comprising:
receiving, by a first identity and access management (IAM) system of a cloud service provider (CSP), a first request to migrate a customer tenancy from the first IAM system to a second IAM system of the CSP;
obtaining, by the first IAM system, a first snapshot of the customer tenancy stored in a first data storage, wherein the customer tenancy includes information related to at least one or more user accounts, or credentials and resources associated with the one or more user accounts;
migrating the first snapshot of the customer tenancy to the second IAM system;
obtaining, by the first IAM system, a second snapshot of the customer tenancy from a second data storage, wherein the second data storage is different than the first data storage, and wherein each of the first data storage and the second data storage belong to the first IAM system;
migrating the second snapshot of the customer tenancy to the second IAM system;
modifying a state of a lock associated with the second data storage;
obtaining a third snapshot of the customer tenancy from the second data storage;
migrating the third snapshot of the customer tenancy to the second IAM system; and
responsive to migrating the third snapshot, directing a second request regarding the customer tenancy to the second IAM system.

14. The non-transitory computer-readable medium of claim 13, wherein the first data storage corresponds to an object storage and the second data storage corresponds to a persistent data storage of the first IAM system.

15. The non-transitory computer-readable medium of claim 14, wherein each of the second snapshot and the third snapshot is obtained from a buffer included in the persistent data storage of the first IAM system.

16. The non-transitory computer-readable medium of claim 13, wherein while migrating the first snapshot of the customer tenancy to the second IAM system, new requests directed to the customer tenancy are stored in the second data storage associated with the first IAM system.

17. The non-transitory computer-readable medium of claim 13, wherein the step of migrating the first snapshot of the customer tenancy to the second IAM system and the step of migrating the second snapshot of the customer tenancy to the second IAM system further includes:
maintaining, by the first IAM system, the state of the lock associated with the second data storage in an unlocked state.

18. The non-transitory computer-readable medium of claim 13, wherein prior to obtaining the third snapshot of the customer tenancy, the first IAM system modifies the state of the lock to be in a locked state.

19. A computing device comprising:
a processor; and
a memory including instructions that, when executed with the processor, cause the computing device to, at least:
receive a first request to migrate a customer tenancy from a first IAM system of a cloud service provider (CSP) to a second IAM system of the CSP;
obtain a first snapshot of the customer tenancy stored in a first data storage, wherein the customer tenancy includes information related to at least one or more user accounts, or credentials and resources associated with the one or more user accounts;
migrate the first snapshot of the customer tenancy to the second IAM system;
obtain a second snapshot of the customer tenancy from a second data storage, wherein the second data storage is different than the first data storage, and wherein each of the first data storage and the second data storage belong to the first IAM system;
migrate the second snapshot of the customer tenancy to the second IAM system;
modify a state of a lock associated with the second data storage;
obtain a third snapshot of the customer tenancy from the second data storage;
migrate the third snapshot of the customer tenancy to the second IAM system; and
responsive to the third snapshot being migrated, directing a second request regarding the customer tenancy to the second IAM system.

20. The computing device of claim 19, wherein the first data storage corresponds to an object storage and the second data storage corresponds to a persistent data storage of the first IAM system, and wherein each of the second snapshot and the third snapshot is obtained from a buffer included in the persistent data storage of the first IAM system.

* * * * *

UNITED STATES PATENT AND TRADEMARK OFFICE
CERTIFICATE OF CORRECTION

PATENT NO. : 12,147,843 B2
APPLICATION NO. : 17/935718
DATED : November 19, 2024
INVENTOR(S) : Tammana et al.

It is certified that error appears in the above-identified patent and that said Letters Patent is hereby corrected as shown below:

On the Title Page

Item [57], Line 2, delete "(TAM)" and insert -- (IAM) --, therefor.

Signed and Sealed this
Eleventh Day of February, 2025

Coke Morgan Stewart
*Acting Director of the United States Patent and Trademark Office*